(12) United States Patent
Tanijiri et al.

(10) Patent No.: US 7,898,502 B2
(45) Date of Patent: Mar. 1, 2011

(54) IMAGE DISPLAY APPARATUS AND HEAD-MOUNTED DISPLAY

(75) Inventors: Yasushi Tanijiri, Osakasayama (JP); Ichiro Kasai, Toyonaka (JP); Tetsuya Noda, Tenri (JP); Hiroshi Yamaguchi, Suita (JP); Yoshie Shimizu, Ibaraki (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1071 days.

(21) Appl. No.: 11/657,979

(22) Filed: Jan. 25, 2007

(65) Prior Publication Data

US 2007/0177239 A1 Aug. 2, 2007

(30) Foreign Application Priority Data

Jan. 30, 2006 (JP) ............................. 2006-020065
Sep. 13, 2006 (JP) ............................. 2006-247520
Nov. 16, 2006 (JP) ............................. 2006-310270
Nov. 16, 2006 (JP) ............................. 2006-310285

(51) Int. Cl.
G09G 5/00 (2006.01)

(52) U.S. Cl. ................................... 345/7; 345/6; 345/9

(58) Field of Classification Search ............... 345/7, 345/419, 83, 84, 204, 207, 63, 6, 9, 690, 345/102; 359/13, 15, 467, 3, 27; 349/11, 349/62; 369/112.02
See application file for complete search history.

(56) References Cited

U.S. PATENT DOCUMENTS

| | | | | |
|---|---|---|---|---|
| 5,315,417 A * | 5/1994 | Moss et al. | ..................... | 359/3 |
| 6,339,486 B1 * | 1/2002 | Popovich | ..................... | 359/15 |
| 6,474,809 B2 | 11/2002 | Tanijiri et al. | ................. | 351/41 |
| 6,680,802 B1 | 1/2004 | Ichikawa et al. | ............ | 359/630 |
| 6,771,403 B1 | 8/2004 | Endo et al. | ..................... | 359/13 |
| 6,816,132 B2 | 11/2004 | Tanijiri et al. | .................. | 345/7 |
| 6,816,314 B2 | 11/2004 | Shimizu et al. | ............. | 359/630 |
| 6,922,267 B2 * | 7/2005 | Endo et al. | ..................... | 359/15 |
| 7,019,798 B2 | 3/2006 | Endo et al. | ..................... | 349/61 |
| 7,023,592 B2 | 4/2006 | Noda et al. | ................... | 359/15 |
| 7,085,027 B2 * | 8/2006 | Ouchi et al. | .................. | 359/16 |
| 7,460,286 B2 * | 12/2008 | Noda et al. | .................... | 359/27 |
| 2001/0033401 A1 | 10/2001 | Kasai et al. | ................... | 359/15 |
| 2002/0135830 A1 * | 9/2002 | Endo et al. | ..................... | 359/15 |

(Continued)

FOREIGN PATENT DOCUMENTS

JP 6-175066 A 6/1994

(Continued)

*Primary Examiner*—Prabodh M Dharia
(74) *Attorney, Agent, or Firm*—Sidley Austin LLP

(57) ABSTRACT

Variation of the wavelength of the light emitted from a light source is reduced by a wavelength variation reduction mechanism. Hence, wavelength deviation of the intensity peak of the light emitted from the light source from the diffraction-efficiency peak of a hologram optical element is reduced. Thus, even when a high-brightness light source is used, the light emitted therefrom can be diffracted with the hologram optical element efficiently. Moreover, the heat generated by the light source is efficiently rejected through the surface of a land portion of a flexible printed circuit, is then, via an insulating layer of the flexible printed circuit, efficiently absorbed through the surface of a heat absorbing member, and is then, via a shield conductor, led out of a casing, so as to be thereby expelled.

25 Claims, 27 Drawing Sheets

U.S. PATENT DOCUMENTS

| | | | |
|---|---|---|---|
| 2002/0181116 A1* | 12/2002 | Togino | 359/631 |
| 2004/0004586 A1 | 1/2004 | Endo et al. | 345/32 |
| 2004/0108971 A1* | 6/2004 | Waldern et al. | 345/8 |
| 2006/0120247 A1* | 6/2006 | Noda et al. | 369/112.02 |
| 2006/0268421 A1* | 11/2006 | Shimizu et al. | 359/630 |
| 2007/0019264 A1* | 1/2007 | Tanijiri et al. | 359/15 |
| 2007/0291355 A1* | 12/2007 | Tanijiri | 359/467 |
| 2010/0066926 A1* | 3/2010 | Tanijiri | 349/11 |

FOREIGN PATENT DOCUMENTS

| | | |
|---|---|---|
| JP | 9-34376 A | 2/1997 |
| JP | 11-326821 A | 11/1999 |
| JP | 2003-24276 A | 1/2003 |
| JP | 2004-333713 A | 11/2004 |

* cited by examiner

IMAGE DISPLAY APPARATUS AND HEAD-MOUNTED DISPLAY

This application is based on the following Japanese Patent Applications, the contents of which are hereby incorporated by reference:

Japanese Patent Application No. 2006-020065 filed on Jan. 30, 2006;

Japanese Patent Application No. 2006-247520 filed on Sep. 13, 2006; and

Japanese Patent Application No. 2006-310270 filed on Nov. 16, 2006;

Japanese Patent Application No. 2006-310285 filed on Nov. 16, 2006.

BACKGROUND OF THE INVENTION

1. Field of the Invention

The present invention relates to an image display apparatus that presents a virtual image of an image displayed on a display element to an observer, and also relates to a head-mounted display (hereinafter also referred to as "HMD") that is provided with such an image display apparatus.

2. Description of Related Art

There have conventionally been proposed various image display apparatuses that allow observation of a virtual image of an image displayed on a display element such as a liquid crystal display element (LCD). For example, Patent Document 1 listed below proposes an image display apparatus that employs as a light source an LED that emits red (R), green (G), and blue (B) light wherein a reflective LCD is irradiated with the R, G, and B light on a time-division basis and the light exiting from the LCD is directed through a main prism portion to an observer's eye.

For another example, Patent Document 2 listed below proposes an image display apparatus wherein a reflective LCD is illuminated by an LED that emits R, G, and B light and the light exiting from the LCD is reflected on a Lippmann three-dimensional hologram and is thereby directed to an observer's eye.

On the other hand, apparatuses called HMDs have been generally known that are mounted on an observer's head and that project a virtual image of an image produced by an image display element through an eyepiece optical system to the observer's eye. These HMDs have, housed in their casing, the image display element along with a light source for illuminating it. In recent years, as increasingly compact, light-weight HMDs are developed, light-emitting diodes (hereinafter also referred to as "LEDs") have come to be generally used as such light sources for their compactness and low cost.

Inconveniently, as an HMD is used for a long period, the rise in temperature inside its casing resulting from the heat generated by an LED may cause undesirable conditions such as a drop in image display brightness and deterioration of components (for example, a heat-induced deformation in a component). To avoid these inconveniences, for example, Patent Documents 3 and 4 listed below propose a method of alleviating the rise in temperature inside an image display apparatus by use of a cooling fan provided inside it. Providing a head-mounted apparatus with a cooling fan, however, makes it large and heavy, making it difficult for an observer wearing the apparatus on his head to use it for a long period.

For another example, Patent Document 5 listed below proposes a method of letting the heat generated by an LED escape out of an endoscope. Specifically, on a circuit board arranged at the tip of the inserted portion of an endoscope, a signal conductor pattern that is electrically connected to an LED is arranged parallel to a ground conductor pattern with an insulating region lying in between. Here, the insulating region is a region where no conductive pattern is arranged, and is formed to surround the periphery of the signal conductor pattern. The ground conductor pattern is grounded via a shield portion of the cable across which electric current is supplied to the LED. In this structure, the heat generated by the LED travels from the signal conductor pattern via the insulating region to the ground conductor pattern, and is then expelled via the shield portion of the cable.

Here is a list of the patent documents mentioned above:

Patent Document 1: U.S. Pat. No. 6,680,802 B1
Patent Document 2: JP-A-H11-326821
Patent Document 3: JP-A-H06-175066
Patent Document 4: JP-A-H09-034376
Patent Document 5: JP-A-2003-024276

In an image display apparatus in which an LCD is driven on a time-division basis, the LCD is irradiated with R, G, and B light on a time-division basis. This permits the light source itself to accumulate a comparatively small amount of heat, and thus the wavelength of the light emitted from the light source is less prone to vary.

In contrast, in an image display apparatus that employs an LCD having, for example, RGB color filters, since the color filters have low light transmissivity, in order to present a bright image, it is necessary to use a high-brightness light source, that is, a light source that emits light with high light intensity. When such a high-brightness light source is used, however, the light source itself accumulates heat, and this causes the wavelength of the emitted light to vary.

On the other hand, a volume-phase-type reflective hologram optical element such as a Lippmann three-dimensional hologram has wavelength dependence, meaning that it only diffracts (reflects) light of a particular wavelength incident on it at a particular angle of incidence. Thus, if, as a result of a light source accumulating heat, the wavelength of the light emitted from it varies and consequently the peak-intensity wavelength of the light emitted from the light source deviates from the peak-diffraction-efficiency wavelength of the hologram optical element, then the light emitted from the light source cannot be diffracted with the hologram optical element efficiently.

Accordingly, in an image display apparatus employing a volume-phase-type reflective hologram optical element, when a high-brightness light source is used in order to present a bright image to the observer, a variation in the wavelength of the light emitted from the light source dims the image presented through the hologram optical element. Moreover, a variation in the wavelength of the light emitted from the light source also degrades the color reproduction of the image presented to the observer.

What is to be noted with Patent Document 5 is that it simply discloses a technique for heat rejection from an LED in an endoscope and that the technique is not intended for application in image display apparatuses.

SUMMARY OF THE INVENTION

In view of the conventionally encountered inconveniences mentioned above, it is an object of the present invention to provide an image display apparatus and a head-mounted display that are designed to avoid degradation of the quality of the image observed by an observer resulting from the heat generated by a light source.

To achieve the above object, according to one aspect of the present invention, an image display apparatus is provided with: a light source that emits light having intensity peaks at predetermined wavelengths corresponding to three primary colors; a display element that produces an image by modulating the light emitted from the light source, the display element having color filters corresponding to the three primary colors; an eyepiece optical system that directs image light from the display element to an observer's eye, the eyepiece optical system having a volume-phase-type reflective hologram optical element that diffracts the light from the display element, the hologram optical element having diffraction-efficiency peaks at wavelengths corresponding to the peak-intensity wavelengths of the light emitted from the light source; and a wavelength variation reduction mechanism that reduces variation of the wavelengths of the light emitted from the light source.

With this construction, variation of the wavelengths of the RGB light emitted from the light source is reduced by the wavelength variation reduction mechanism. Hence, wavelength deviation of the intensity peaks of the light emitted from the light source from the diffraction-efficiency peaks of the hologram optical element can be reduced. Thus, even in a construction employing a high-brightness light source, a display element having RGB color filters, and a volume-phase-type reflective hologram optical element, the light emitted from the light source can be diffracted with the hologram optical element efficiently to present a bright image. Moreover, since variation of the wavelengths of the light emitted from the light source is reduced, the image can be presented with high color purity and high-grade color reproduction.

To achieve the above object, according to another aspect of the present invention, an image display apparatus is provided with: a light source including a light-emitting diode, the light-emitting diode being mounted on a circuit board; a display element that produces an image by modulating light emitted from the light source; an eyepiece optical system that directs image light from the display element to an observer's eye; a heat absorbing member that is arranged on the side of the circuit board opposite from the side thereof on which the light-emitting diode is mounted, the heat absorbing member absorbing heat generated by the light-emitting diode; and a heat conducting member that conducts the heat absorbed by the heat absorbing member out of a casing.

With this construction, the heat generated by the light source can be efficiently rejected from the circuit board and efficiently absorbed through the surface of the heat absorbing member. The heat absorbed by the heat absorbing member can then be, via the heat conducting member, led out of the casing so as to be thereby expelled. That is, the heat generated by the light source can be efficiently led out of the casing and thereby expelled. In this way, it is possible to avoid undesirable conditions resulting from the heat generated by the light source, such as a drop in image brightness and deterioration of components.

To achieve the above object, according to yet another aspect of the present invention, a head-mounted display is provided with: one of the above-described image display apparatuses according to the present invention; and a supporting member that supports the image display apparatus in front of the observer's eye.

With this construction, since the image display apparatus is supported by the supporting member, the observer can observe the image presented by the image display apparatus in a hands-free fashion.

To achieve the above object, according to still another aspect of the present invention, an image display apparatus is provided with: a light source including a light-emitting diode mounted on a circuit board, said light source emitting light having intensity peaks at predetermined wavelengths corresponding to three primary colors; a display element that produces an image by modulating light emitted from the light source; an eyepiece optical system that directs image light from the display element to an observer's eye, the eyepiece optical system having a volume-phase-type reflective hologram optical element that diffracts the light from the display element, the hologram optical element having diffraction-efficiency peaks at wavelengths corresponding to the peak-intensity wavelengths of the light emitted from the light source; a heat absorbing member that is arranged on the circuit board to absorb heat generated by the light-emitting diode; and a heat conducting member that conducts the heat absorbed by the heat absorbing member to outside a casing.

To achieve the above object, according to a further aspect of the present invention, a head-mounted display is provided with: the above-described image display apparatus according to the present invention; and a supporting member that supports the image display apparatus in front of the observer's eye.

BRIEF DESCRIPTION OF THE DRAWINGS

These and other objects and features of the present invention will be apparent from the following detailed description of preferred embodiments thereof taken in conjunction with the accompanying drawings, in which.

DETAILED DESCRIPTION OF PREFERRED EMBODIMENTS

Embodiment 1

An embodiment of the present invention will be described below with reference to the accompanying drawings.

1. Construction of an HMD

Figure 2A:
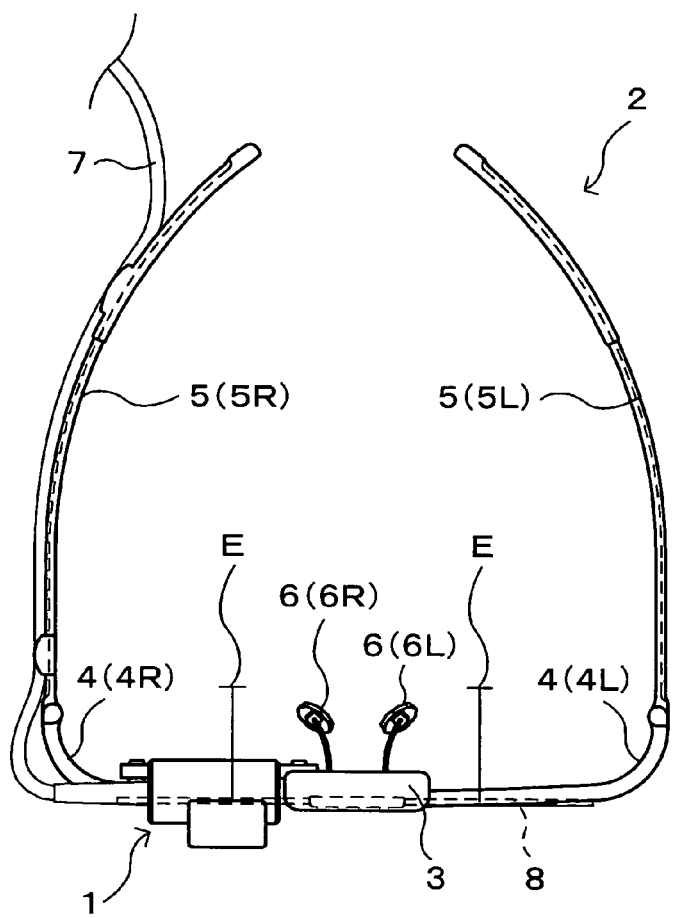
FIG. 2A is a plan view showing an outline of the construction of the above head-mounted display.
Figure 2B:
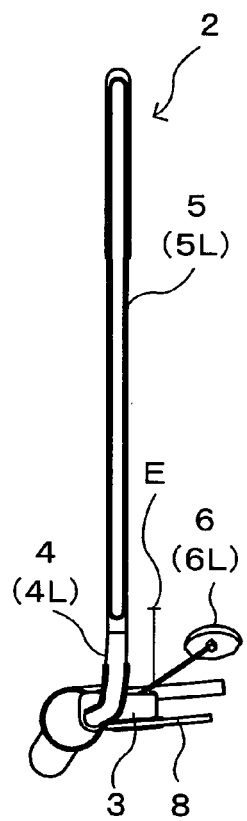
FIG. 2B is a side view of the above head-mounted display.
Figure 2C:
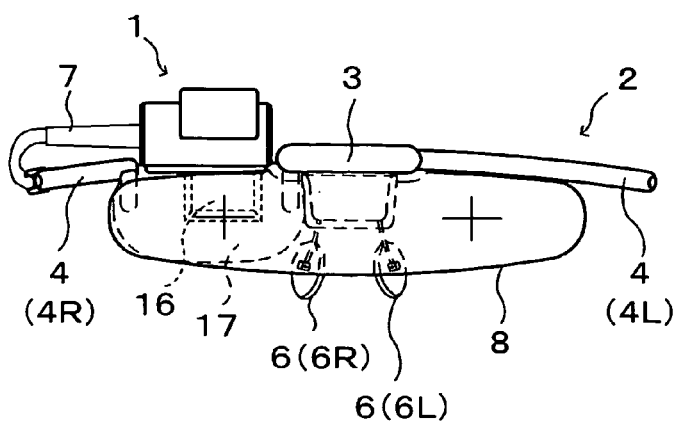
FIG. 2C is a front view of the above head-mounted display.

FIG. 2A is a plan view showing an outline of the construction of a head-mounted display (hereinafter abbreviated to "HMD") as a first embodiment of the present invention; FIG. 2B is a side view of the HMD; FIG. 2C is a front view of the HMD. The HMD includes an image display apparatus 1 and supporting means 2 (a supporting member) for supporting it. As a whole, the HMD has an exterior appearance like common spectacles having one of the lenses thereof (for example, the left-eye lens) removed.

The image display apparatus 1 allows an observer to observe an outside image in a see-through fashion, and simultaneously displays an image to present a virtual image thereof to the observer. In the image display apparatus 1 shown in FIG. 2C, the portion thereof corresponding to the right-eye lens of spectacles is composed of an eyepiece prism 16 and a deflecting prism 17 bonded together, as will be described later. The construction of the image display apparatus 1 will be described in detail later.

The supporting means 2 is for supporting the image display apparatus 1 in front of the observer's eye (for example, in front of the right eye). The supporting means 2 includes a bridge 3, a pair of frames 4, a pair of temples 5, a pair of nose pads 6, a cable 7, and outside light transmissivity controlling means 8. The frames 4, the temples 5, and the nose pads 6 are provided in pairs, each composed of left and right members; whenever the left and right members need to be distinguished, they will be referred to as follows: the right frame 4R, the left frame 4L, the right temple 5R, the left temple 5L, the right nose pad 6R, and the left nose pad 6L.

One end of the image display apparatus 1 is supported by the bridge 3. The bridge 3 supports not only the image display apparatus 1 but also the left frame 4L, the nose pads 6, and the outside light transmissivity controlling means 8. The left frame 4L rotatably supports the left temple 5L. The other end of the image display apparatus 1 is supported by the right frame 4R. The right frame 4R, at the end thereof opposite from the end at which it supports the image display apparatus 1, rotatably supports the right temple 5R. The cable 7 contains conductors across which the image display apparatus 1 is supplied with external signals (for example, image signals and control signals) and electric power. The cable 7 is arranged along the right frame 4R and the right temple 5R. The outside light transmissivity controlling means 8 is provided on the bridge 3 to control the transmissivity of outside light (the light of an outside image). The outside light transmissivity controlling means 8 is located in front of the image display apparatus 1 (on the opposite side thereof from the observer).

When an observer uses the HMD, he wears it on his head as if wearing common spectacles, with the right and left temples 5R and 5L touching right and left side portions of the head, and with the nose pads 6 resting on the nose. In this state, when an image is displayed on the image display apparatus 1, the observer can observe a virtual image of the image on the image display apparatus 1, and can simultaneously observe an outside image through the image display apparatus 1 in a see-through fashion.

Here, giving the outside light transmissivity controlling means 8 a low outside light transmissivity, for example 50% or less, makes it easier for the observer to observe the image of the image display apparatus 1; in contrast, giving the outside light transmissivity controlling means 8 a high outside light transmissivity, for example 50% or more, makes it easier for the observer to observe the outside image. The outside light transmissivity of the outside light transmissivity controlling means 8 is therefore set appropriately according to what degrees of ease to allow in the observation of the image of the image display apparatus 1 and in the observation of the outside image.

Figure 3A:
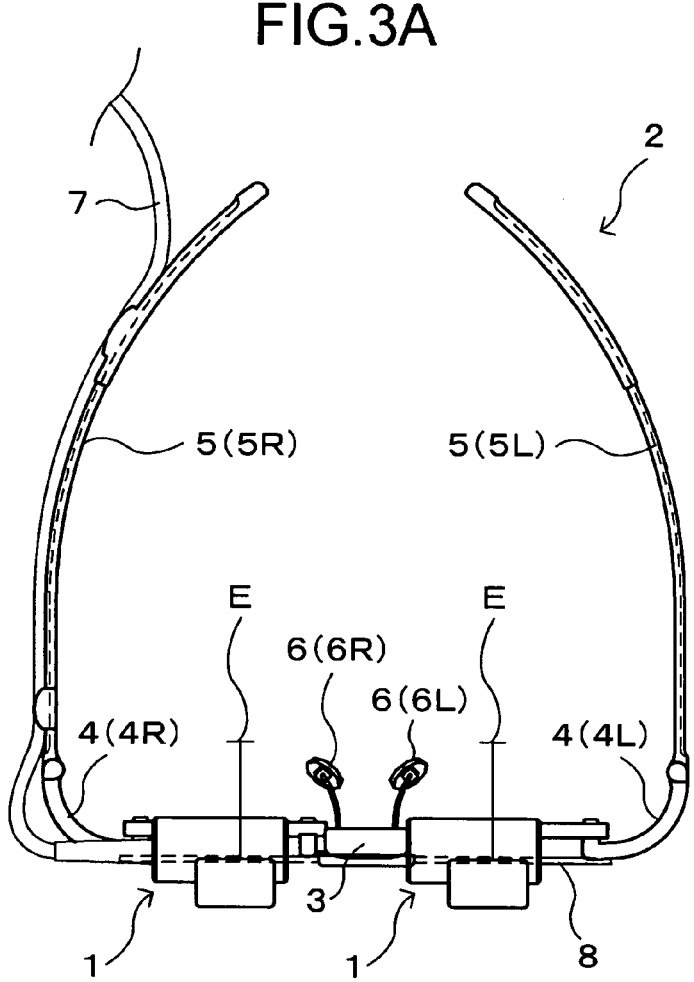
FIG. 3A is a plan view showing an outline of the construction of another head-mounted display.
Figure 3B:
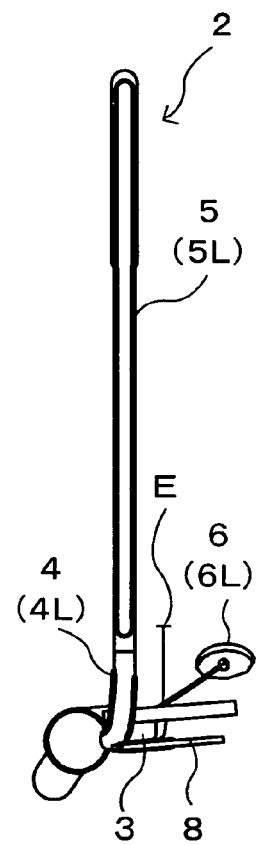
FIG. 3B is a side view of the above head-mounted display.
Figure 3C:
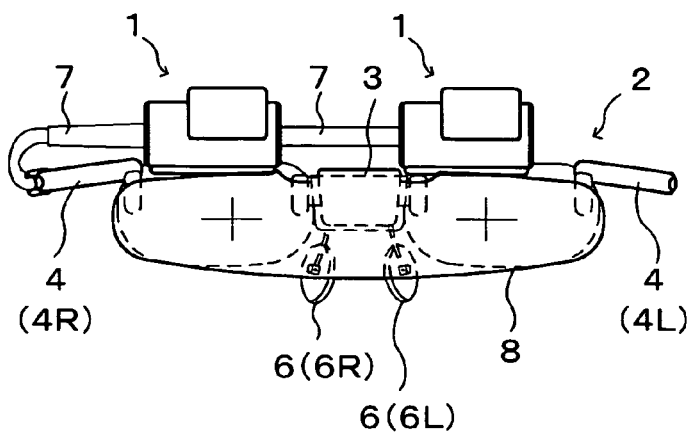
FIG. 3C is a front view of the above head-mounted display.

The HMD may be provided with any number of image display apparatuses 1 other than one, for example as shown in FIGS. 3A, 3B, and 3C. FIG. 3A is a plan view showing another example of the construction of the HMD; FIG. 3B is a side view of the HMD; and FIG. 3C is a front view of the HMD. In this way, the HMD may be provided with two image display apparatuses 1 arranged in front of both eyes of an observer. In this case, the image display apparatus 1 arranged in front of the left eye is supported by the bridge 3 and the left frame 4L so as to be located therebetween; the cable 7 is connected to both image display apparatuses 1 so that external signals etc. are supplied across it to both image display apparatuses 1.

2. Details of the Image Display Apparatus

Figure 1:
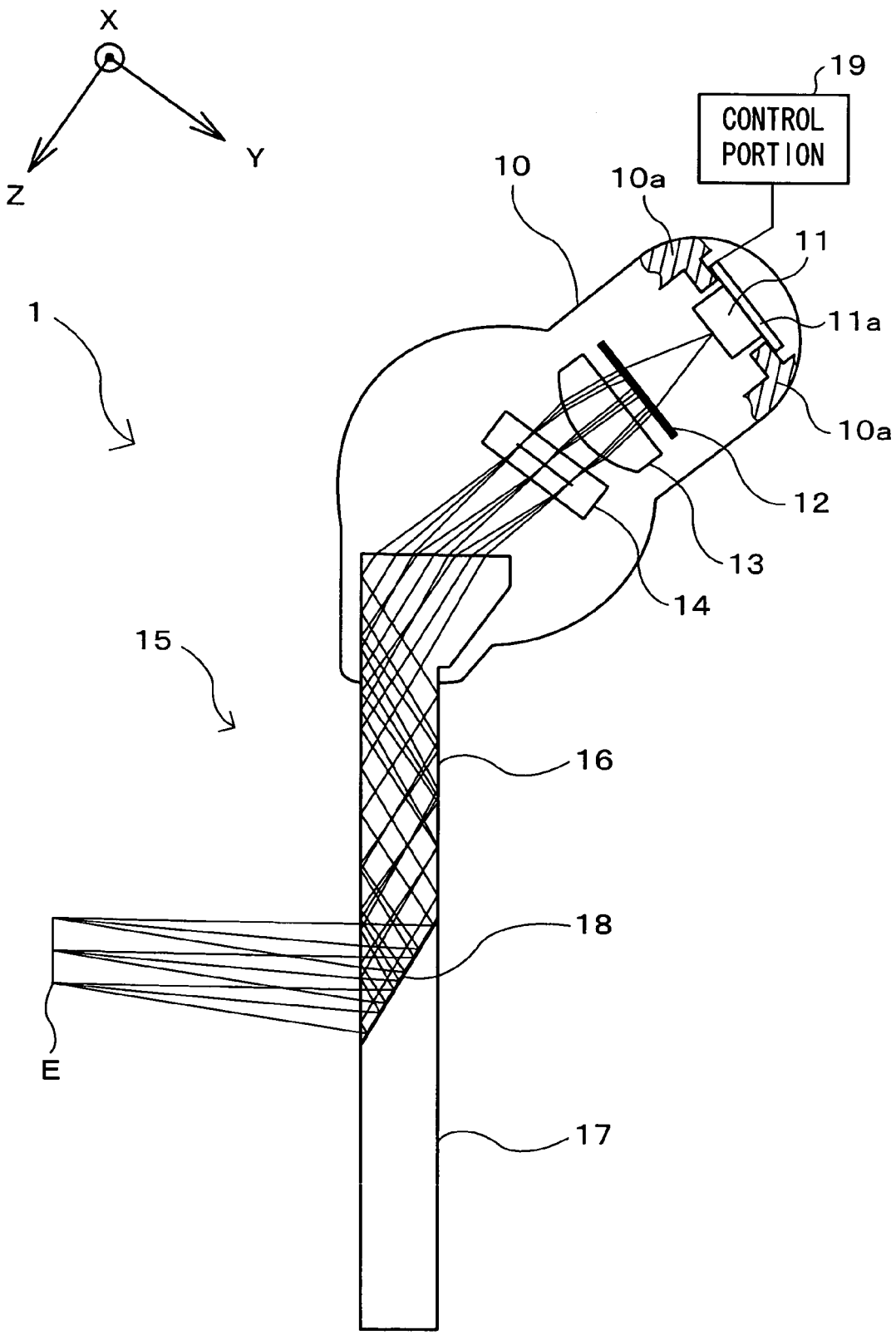
FIG. 1 is a cross-sectional view showing, as one embodiment of the present invention, an outline of the construction of an image display apparatus used in a head-mounted display.
Figure 4:
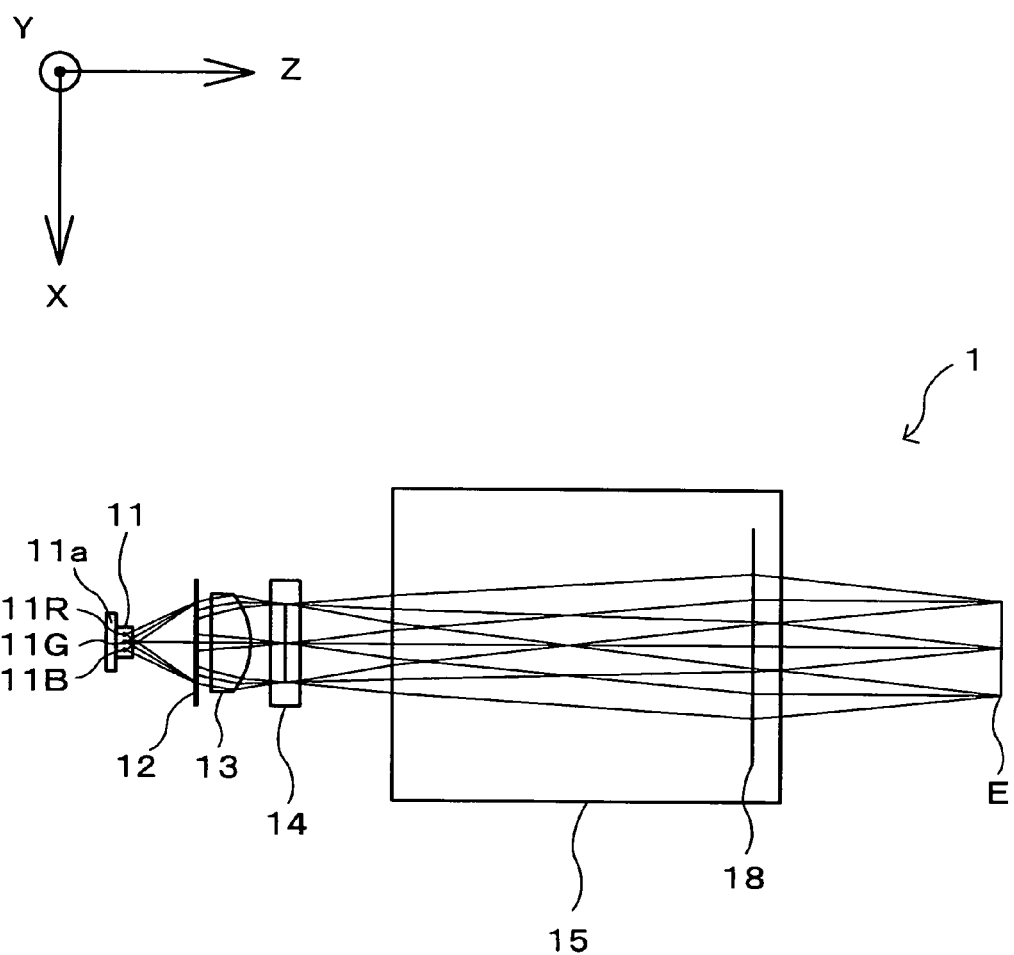
FIG. 4 is a diagram illustrating the optical paths in the above image display apparatus, as optically unfolded in one direction.

Next, the construction of the image display apparatus 1 will be described in detail. FIG. 1 is a cross-sectional view showing an outline of the construction of the image display apparatus 1; and FIG. 4 is a diagram illustrating the optical paths in the image display apparatus 1, as optically unfolded in one direction. The image display apparatus 1 includes a light source 11, a one-way diffuser plate 12, a condenser lens 13, a display element 14, and an eyepiece optical system 15. As shown in FIG. 1, the light source 11, the one-way diffuser plate 12, the condenser lens 13, and the display element 14 are housed inside a casing 10, and part of the eyepiece optical system 15 (part of an eyepiece prism 16, which will be described later) is located inside the casing 10.

For the sake of convenience, the following conventions are used in the description that follows: the axis that optically connects the center of the display area on the display element 14 to the center of the optical pupil E formed by the eyepiece optical system 15 is referred to as the optical axis; the direction in which the optical axis extends when the optical paths from the light source 11 to the optical pupil E are unfolded is referred to as the Z direction; the direction perpendicular to the plane of incidence along which the optical axis runs onto a hologram optical element 18, which will be described later, provided in the eyepiece optical system 15 is referred to as the X direction; and the direction perpendicular to the ZX plane is referred to as the Y direction. Here, the plane of incidence along which the optical axis runs onto the hologram optical element 18 is the plane that includes both the optical axis of the light incident on the hologram optical element 18 and the optical axis of the light reflected therefrom; that is, it denotes the YZ plane. In the following description, this plane of incidence is referred to simply as the plane of incidence or the plane of incidence of the optical axis.

Used as the light source 11 in this embodiment is an integrated RGB LED that has, as light-emitting portions 11R, 11G, and 11B (see FIG. 4), three light-emitting chips that emit light of wavelengths corresponding to three primary colors, namely red (R), green (G), and blue (B). An LED is inexpensive and compact; in addition, it emits light in narrow wavelength bands, as will be described later, and thus offers high color purity. Thus, using an LED as the light source 11 helps realize an inexpensive, compact image display apparatus, and helps enhance the color purity of the image presented to the observer.

The light-emitting portions 11R, 11G, and 11B of the light source 11 are fixed on a circuit board 11a, and are electrically connected, across electrical conductors (copper foil conductors) on the circuit board 11a, to a control portion 19. The control portion 19 serves as controlling means (a control circuit) for controlling the emission of light from the light-emitting portions 11R, 11G and 11B. The control portion 19 is composed of, for example, a drive circuit that supplies electric currents to the light-emitting portions 11R, 11G, and 11B and a microcomputer that controls the drive circuit.

On the circuit board 11a, the light-emitting portions 11R, 11G, and 11B are arranged side by side in the X direction, in which direction the one-way diffuser plate 12 exhibits a higher degree of diffusion. This helps reduce uneven light intensity among the different colors at the optical pupil E, and thus helps reduce color unevenness.

The one-way diffuser plate 12 diffuses the light emitted from the light source 11 at different degrees of diffusion in different directions. Specifically, the one-way diffuser plate 12 diffuses the light incident thereon at about 40° in the X direction and at about 0.5° in the Y direction. The one-way diffuser plate 12 has, on the light source 11 side, an optically flat face and, on the condenser lens 13 side, an uneven face that diffuses light with surface irregularities. Thus, the divergent light from the light source 11 is first slightly condensed by being refracted by the flat face of the one-way diffuser plate 12 and is then diffused; meanwhile, the light remains relatively condensed. In this way, the one-way diffuser plate 12 acts somewhat like a convex lens, slightly refracting the light incident thereon into the direction in which it needs to be directed to form the optical pupil E.

Used as the condenser lens 13 is a cylindrical lens that condenses, in the Y direction, the light diffused by the one-way diffuser plate 12. The condenser lens 13 is so arranged that the diffused light efficiently forms the optical pupil E. In this embodiment, the optical pupil E is sized 6 mm in the X direction and 2 mm in the Y direction. In this way, in one direction (in the X direction), the optical pupil E is sized 6 mm, and is thus larger than the human pupil (about 3 mm), allowing the observer easy observation of the presented image; on the other hand, in the other direction (in the Y direction), the optical pupil E is sized 2 mm, and is thus smaller than the human pupil, permitting the light from the light source 11 to be condensed in the optical pupil E without loss in this direction, and hence allowing the observer observation of a bright image.

Figure 5:
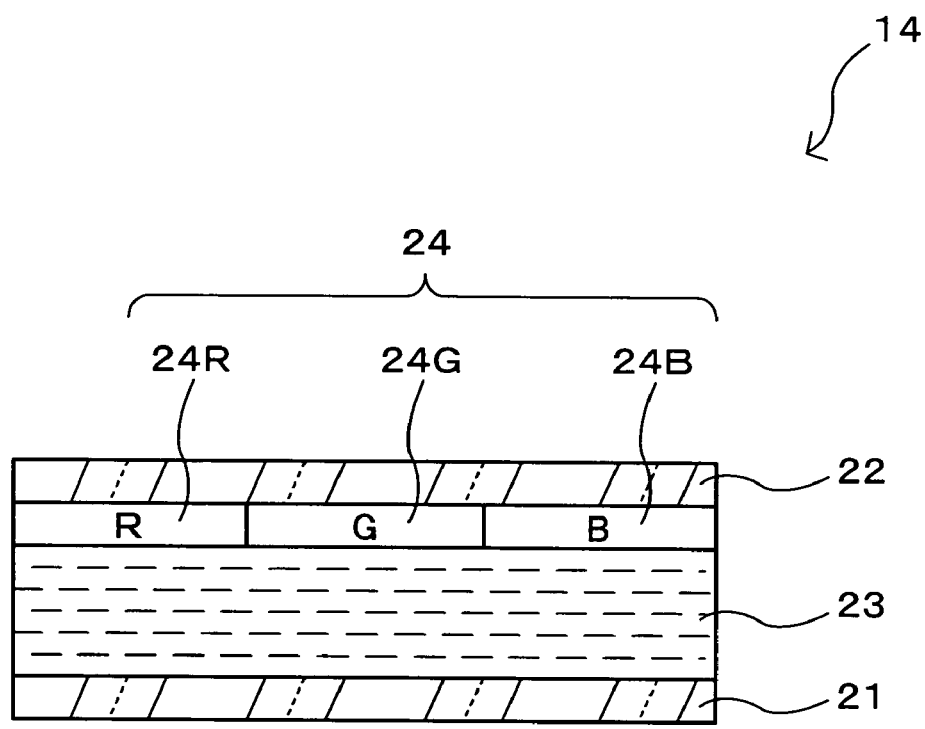
FIG. 5 is a cross-sectional view showing, in simplified form, an outline of the structure of the display element provided in the above image display apparatus.

The display element 14 displays an image by modulating the light emitted from the light source 11 according to image data. Used as the display element 14 is a transmissive liquid crystal display element that has, as regions through which it transmits light, pixels arrayed in a matrix-like formation. FIG. 5 is a cross-sectional view showing, in simplified form, an outline of the structure of the display element 14. The display element 14 has a liquid crystal layer 23 held between two glass substrates 21 and 22. The liquid crystal layer 23 is formed of, for example, TN (twisted nematic) liquid crystal.

On one glass substrate 21, TFTs (thin-film transistors) acting as switching devices for turning the pixels on and off individually are arranged in a matrix-like formation, one for each pixel. On the other glass substrate 22, color filters 24 are formed. Although in reality there are also provided transparent electrodes (pixel electrodes and common electrodes), polarizer plates, alignment films, etc, these are omitted from illustration in FIG. 5.

The color filters 24 are transmission wavelength limiting filters that restrict the transmission therethrough of particular portions of the light emitted from the light source 11 according to the wavelengths of the light of the previously mentioned colors. In this embodiment, the color filters 24 are composed of three types of filters corresponding to the three primary colors, each filter transmitting, of the light transmitted from the light source 11, light of one of the wavelengths corresponding to the three primary colors, namely R, G, and B and restricting the transmission of the other light. Specifically, the color filters 24 are composed of filters 24R (R filters), filters 24G (G filters), and filters 24B (B filters), and these are provided one for each pixel. The filters 24R transmit red light and restrict the transmission of other (green and blue) light; the filters 24G transmit green light and restrict the transmission of other (blue and red) light; the filters 24B transmit blue light and restrict the transmission of other (red and green) light.

Thus provided with the color filters 24, the display element 14 modulates the light from the light source 11 according to image data and emits it through the color filters 24. In this way, the display element 14 can display a color image. The display element 14 is arranged with the longer sides of the rectangular display area thereof aligned in the X direction and the shorter sides in the Y direction.

The eyepiece optical system 15 shown in FIG. 1 directs image light from the display element 14, that is, the light corresponding to the image displayed on the display element 14, to the observer's eye. The eyepiece optical system 15 includes an eyepiece prism 16 (a first transparent substrate), a deflecting prism 17 (a second transparent substrate), and a hologram optical element 18.

The eyepiece prism 16 reflects, by internal total reflection, the image light from the display element 14 to direct it through the hologram optical element 18 to the observer's eye, and simultaneously transmits outside light to direct it to the observer's eye. The eyepiece prism 16 and the deflecting prism 17 are both formed of, for example, acrylic resin. The eyepiece prism 16 has the shape of a parallel plate of which a bottom end portion is made increasingly thin toward the bottom edge so as to be wedge-shaped and of which top end portion is made increasingly thick tower the top edge. The eyepiece prism 16 is bonded to the deflecting prism 17 with adhesive so that the hologram optical element 18, which is arranged in the bottom end portion of the eyepiece prism 16 is held between it and the hologram optical element 18.

The deflecting prism 17 is a parallel plate that is substantially U-shaped as seen in a front view (see FIG. 2C). When the eyepiece prism 16 is, at the bottom end portion and both side portions (left and right edge faces) thereof, bonded to the deflecting prism 17, together the deflecting prism 17 and the eyepiece prism 16 form a single member having substantially the shape of a parallel plate. Here, bonding the deflecting prism 17 to the eyepiece prism 16 helps prevent distortion in the outside image that the observer observes through the eyepiece optical system 15.

The reason is as follows. If the deflecting prism 17 is not bonded to the eyepiece prism 16, when outside light is transmitted through the wedge-shaped bottom end portion of the eyepiece prism 16, it is refracted, with the result that distortion appears in the outside image observed through the eyepiece prism 16. In contrast, when the deflecting prism 17 is bonded to the eyepiece prism 16 so that together they substantially form a parallel plate, the refraction that outside light experiences when transmitted through the wedge-shaped bottom end portion of the eyepiece prism 16 can be canceled by the deflecting prism 17. This prevents distortion in the outside image observed in a see-through fashion.

The faces (light entrance face and light exit face) of the eyepiece prism 16 and the deflecting prism 17 may each be flat or spherical. Giving one or more of the faces of the eyepiece prism 16 and the deflecting prism 17 a curvature makes it possible for the eyepiece optical system 15 to function as an eyesight-correcting lens.

The hologram optical element 18 is a volume-phase-type hologram that diffracts the image light (light of wavelengths corresponding to the three primary colors) exiting from the display element 14 so that the image displayed on the display element 14 is enlarged and directed, as a virtual image, to the observer's eye. The hologram optical element 18 has an axis-asymmetric positive optical power. That is, the hologram optical element 18 functions in a similar manner to an aspherical concave mirror having a positive optical power. This leads to increased flexibility in the arrangement of the optical components provided in the apparatus, making it easy to build the apparatus compact; also, the observer can be presented with an image satisfactorily corrected for aberrations. The hologram optical element 18 also functions as a combiner that directs the image light from the display element 14 and outside light simultaneously to the observer's eye. This permits the observer to observe, through the hologram optical element 18, the image provided by the display element 14 and the outside image simultaneously.

3. Operation of the Image Display Apparatus

Next, the operation of the image display apparatus 1 constructed as described above will be described. The light emitted from the light source 11 is diffused by the one-way diffuser plate 12, and is then condensed by the condenser lens 13 to enter the display element 14. The light that has entered the display element 14 is modulated pixel by pixel according to image data, and exits therefrom as image light through the color filters 24. That is, the display element 14 displays a color image.

The image light from the display element 14 enters the eyepiece prism 16, provided in the eyepiece optical system 15, through the top end face thereof, is then totally reflected a plurality of times on opposite faces of the eyepiece prism 16, and is then incident on the hologram optical element 18. The light incident on the hologram optical element 18 is reflected therefrom to reach the optical pupil E. At the position of the optical pupil E, the observer can observe an enlarged virtual image of the image displayed on the display element 14.

In addition, the eyepiece prism 16 and the deflecting prism 17 transmit almost all outside light, and thereby enable the observer to observe the outside image. Thus, the virtual image of the image displayed on the display element 14 is observed overlaid on part of the outside image.

As described above, the construction of the image display apparatus 1 is such that the image light exiting from the display element 14 is directed to the hologram optical element 18 by being totally reflected inside the eyepiece prism 16. This permits the eyepiece prism 16 and the deflecting prism 17 to be formed with a thickness of about 3 mm, like common spectacles lenses, and thus helps make the image display apparatus 1 compact and lightweight. Moreover, the use of the eyepiece prism 16, which totally reflects inside itself the image light from the display element 14, helps obtain high transmissivity to outside light, enabling the observer to observe a bright outside image.

4. Characteristics of the Hologram Optical Element, Color Filters, and Light Source Next, the characteristics of the hologram optical element 18, the color filters 24, and the light source 11 mentioned above will be described.

4-1. Characteristics of the Hologram Optical Element

Figure 6:
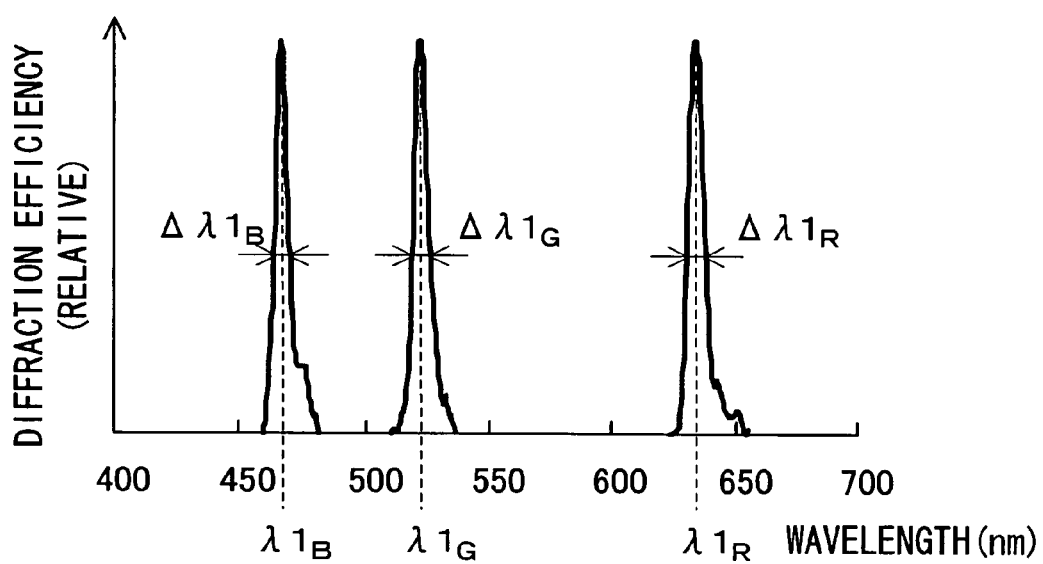
FIG. 6 is a diagram illustrating the wavelength dependence of the diffraction efficiency of the hologram optical element provided in the above image display apparatus.

FIG. 6 is a diagram illustrating the wavelength dependence of the diffraction efficiency of the hologram optical element 18. As shown in this figure, the hologram optical element 18 is so fabricated as to diffract (reflect) light in three wavelength bands of 465±5 nm (B light), 521±5 nm (G light), and 634±5 nm (R light) as represented in terms of their respective peak-diffraction-efficiency wavelengths and diffraction-efficiency half-peak wavelength widths. Here, a peak-diffraction-efficiency wavelength is the wavelength at which a peak is obtained in diffraction efficiency; a diffraction-efficiency half-peak wavelength width is the wavelength width at both ends of which half the peak diffraction efficiency is obtained. In FIG. 6, diffraction efficiency is given in terms relative to 100, at which the maximum diffraction efficiency for B light is assumed to be.

Thus, in the hologram optical element 18 in this embodiment, the peak-diffraction-efficiency wavelength $\lambda 1_B$ for B light is 465 nm, the peak-diffraction-efficiency wavelength $\lambda 1_G$ for G light is 521 nm, and the peak-diffraction-efficiency wavelength $\lambda 1_R$ for R light is 634 nm. Moreover, in the hologram optical element 18, the diffraction-efficiency half-peak wavelength width $\Delta\lambda 1_B$ for B light is 10 nm, the diffraction-efficiency half-peak wavelength width $\Delta\lambda 1_G$ for G light is 10 nm, and the diffraction-efficiency half-peak wavelength width $\Delta\lambda 1_R$ for RB light is 10 nm.

As described above, the hologram optical element 18 is so fabricated as to diffract light of particular wavelengths incident thereon at a particular angle of incidence, and therefore exerts almost no influence on the transmission of outside light. Thus, through the eyepiece prism 16, the hologram optical element 18, and the deflecting prism 17, the observer can view the outside image as usual.

4-2. Characteristics of the Color Filters

Figure 7:
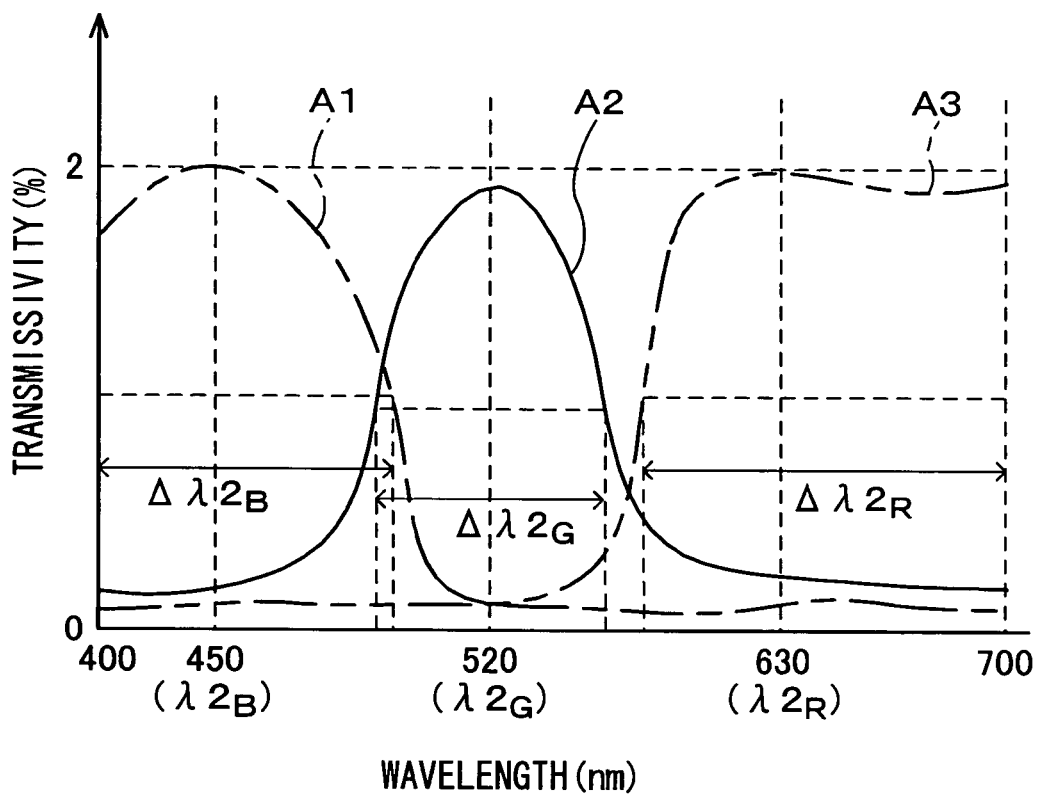
FIG. 7 is a diagram illustrating the wavelength dependence of the transmissivity of the color filters provided in the above display element.

FIG. 7 is a diagram illustrating the wavelength dependence of the transmissivity of the color filters 24 of the display element 14. In the figure, long-short dash line A1 represents the wavelength dependence of the transmissivity of the filters 24B, solid line A2 represents the wavelength dependence of the transmissivity of the filters 24G, and long-short-short dash line A3 represents the wavelength dependence of the transmissivity of the filters 24R.

As shown in FIG. 7, among the color filters 24, the transmissivity peak wavelength $\lambda 2_B$ of the filters 24B (the wavelength at which they exhibit a peak transmissivity) is 450 nm, the transmissivity peak wavelength $\lambda 2_G$ of the filters 24G is 520 nm, and the transmissivity peak wavelength $\lambda 2_R$ of the filters 24R is 630 mm.

Moreover, the filters 24B absorb light of wavelengths of 510 nm or more on a transmissivity half-peak basis, the filters 24G absorb light of wavelengths of 490 nm or less and 565 nm or more on a transmissivity half-peak basis, and the filters 24R absorb light of wavelengths of 590 nm or less on a transmissivity half-peak basis. The filters 24B, 24G, and 24R transmit light of B, G, and R wavelength bands, respectively, to let it reach the corresponding pixels.

Put in another way, if we consider visible light to be spreading from 400 nm to 700 nm, then the transmissivity half-peak wavelength width $\Delta\lambda 2_B$ of the filters 24B (the wavelength width at both ends of which half the peak transmissivity is obtained) is 110 mm, ranging from 400 nm to 510 mm, the transmissivity half-peak wavelength width $\Delta\lambda 2_G$ of the filters 24G is 75 nm, and the transmissivity half-peak wavelength width $\Delta\lambda 2_R$ of the filters 24R is 110 nm, ranging from 590 nm to 700 nm.

Since light of wavelengths of 400 mm or less (ultraviolet light) is invisible, the filters 24B may be designed not to absorb but transmit light of wavelengths of 400 nm or less. Likewise, since light of wavelengths of 700 nm or more (infrared light) is invisible, the filters 24R may be designed not to absorb but transmit light of wavelengths of 700 nm or more. Designing the filters 24B and 24R in this way does not influence color reproduction. Out of these considerations, the widths $\Delta\lambda 2_B$ and $\Delta\lambda 2_R$ may be considered to be at least 110 nm each.

4-3. Characteristics of the Light Source

Figure 8:
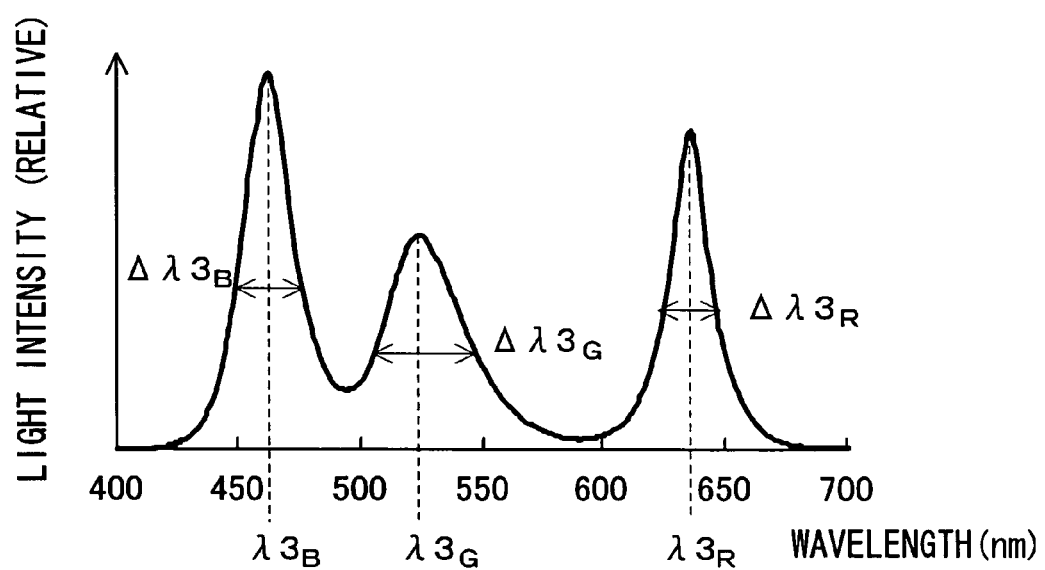
FIG. 8 is a diagram illustrating the spectral intensity characteristics of the light source provided in the above image display apparatus.

FIG. 8 is a diagram illustrating the spectral intensity characteristics of the light source 11, that is, the relationship between the wavelengths and the light intensity of the light emitted therefrom. The light source 11 is an integrated RGB LED (for example, one manufactured by Nichia Corporation) that emits light in three wavelength bands of 462±12 nm, 525±17 nm, and 635±11 nm as represented in terms of their respective peak-light-intensity wavelengths and light-intensity half-peak wavelength widths. Here, a peak-light-intensity wavelength is the wavelength at which a peak is obtained in light intensity; a light-intensity half-peak wavelength width is the wavelength width at both ends of which half the peak light intensity is obtained. In FIG. 8, light intensity is given in terms relative to 100, at which the maximum light intensity of B light is assumed to be.

That is, in this embodiment, let the B, G, and R peak-light-intensity wavelengths of the light source 11 be $\lambda 3_B$, $\lambda 3_G$, and $\lambda 3_R$, respectively, then $\lambda 3_B$=462 nm, $\lambda 3_G$=525 nm, and $\lambda 3_R$=635 nm. Moreover, let the B, G, and R light-intensity half-peak wavelength widths of the light source 11 be $\Delta\lambda 3_B$, $\Delta\lambda 3_G$, and $\Delta\lambda 3_R$, respectively, then $\Delta\lambda 3_B$=24 nm, $\Delta\lambda 3_G$=34 nm, and $\Delta\lambda 3_R$=22 nm.

The R, G, and B intensities of the light source 11 are adjusted with consideration given to the diffraction efficiency of the hologram optical element 18 and the light transmissivity of the color filters 24 of the display element 14. This makes it possible to display white.

As described above, the light emitted from the light source 11 has a light intensity peak in each of the R, G, and B wavelength bands, and the hologram optical element 18 likewise has a diffraction-efficiency peak in each of the R, G, and B wavelength bands. Thus, it can be said that, while the light emitted from the light source 11 has light intensity peaks at predetermined wavelengths (here, wavelengths corresponding to R, G, and B), the hologram optical element 18 has diffraction-efficiency peaks at wavelengths (here, those of R, G, and B) corresponding to the peak-light-intensities of the light emitted from the light source 11.

4-4. Relationship Among the Relevant Parameters

Table 1 below lists the above-mentioned parameters associated with the hologram optical element 18, the color filters 24, and the light source 11. Now, with reference to this table, the relationship among these parameters will be described.

|  | B | G | R |
| --- | --- | --- | --- |
| Hologram Optical Element | $\lambda 1_B$(465) ± 5 ($\Delta\lambda 1_B$ = 10) | $\lambda 1_G$(521) ± 5 ($\Delta\lambda 1_G$ = 10) | $\lambda 1_R$(634) ± 5 ($\Delta\lambda 1_R$ = 10) |
| Color Filter | $\lambda 2_B$(450) ($\Delta\lambda 2_B \geq$ 110) | $\lambda 2_G$(520) ($\Delta\lambda 2_G \geq$ 75) | $\lambda 2_R$(630) ($\Delta\lambda 2_R \geq$ 110) |
| Light Source | $\lambda 3_B$(462) ± 12 ($\Delta\lambda 3_B$ = 24) | $\lambda 3_G$(525) ± 17 ($\Delta\lambda 3_G$ = 34) | $\lambda 3_R$(635) ± 11 ($\Delta\lambda 3_R$ = 22) |

(All values in nm)

In this embodiment, first of all, the relationship between the B, G, and R diffraction-efficiency half-peak wavelength widths $\Delta\lambda 1$ ($\Delta\lambda 1_B$, $\Delta\lambda 1_G$, and $\Delta\lambda 1_R$) of the hologram optical element 18 and the B, G, and R transmissivity half-peak wavelength widths $\Delta\lambda 2$ ($\Delta\lambda 2_B$, $\Delta\lambda 2_G$, and $\Delta\lambda 2_R$) is set such that, for each of B, G, and R, $\Delta\lambda 1 < \Delta\lambda 2$.

That is, the following formulae are simultaneously fulfilled:

$\Delta\lambda 1_B < \Delta\lambda 2_B$, $\Delta\lambda 1_G < \Delta\lambda 2_G$, and $\Delta\lambda 1_R < \Delta\lambda 2_R$ Thanks to the relationship $\Delta\lambda 1 < \Delta\lambda 2$ for each of B, G, and R, when, as in this embodiment, the diffraction-efficiency peak wavelengths $\lambda 1$ of the hologram optical element 18 are set close to the transmissivity peak wavelengths $\lambda 2$ of the color filters 24 for each of the B, G, and R, then, with the hologram optical element 18, light in wavelength bands narrower than those of the light transmitted through the filters 24B, 24G, and 24R can be diffracted so as to be directed to the observer's eye. Thus, even by use of a display element 14 having color filters 24, it is possible to enhance the color purity in all of B, G, and R, and thereby to broaden the color reproduction region of the observed image (virtual image).

Moreover, in this embodiment, the B, G, and R light-intensity half-peak wavelength widths $\Delta\lambda 3$ ($\Delta\lambda 3_B$, $\Delta\lambda 3_G$, and $\Delta\lambda 3_R$) of the light source 11 are as wide as 20 nm or more. Thus, by setting the B, G, and R diffraction-efficiency half-peak wavelength widths $\Delta\lambda 1$ ($\Delta\lambda 1_B$, $\Delta\lambda 1_G$, and $\Delta\lambda 1_R$) of the hologram optical element 18 at less than 20 nm, it is possible to surely enhance the color purity in all of B, G, and R, and thereby to surely broaden the color reproduction region of the observed image.

Figure 9:
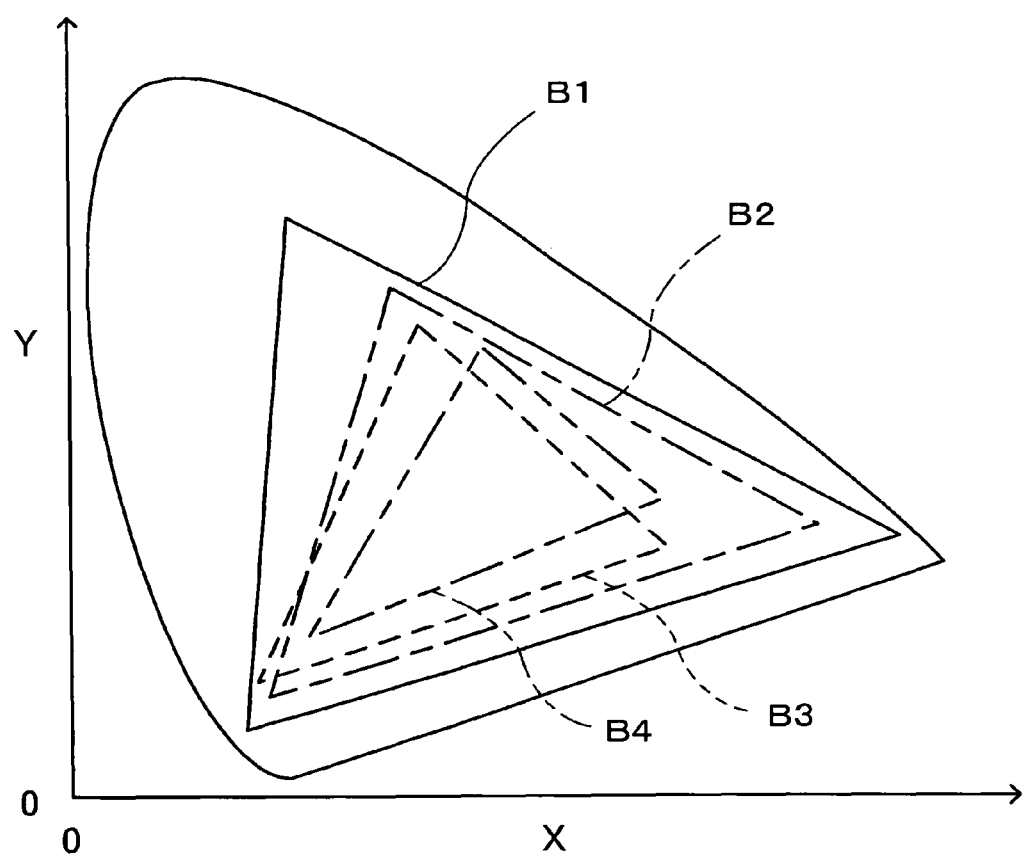
FIG. 9 is a diagram illustrating the color reproduction region of the virtual image, as represented using XY chromaticity coordinates in an XYZ color representation system.

FIG. 9 is a diagram illustrating the color reproduction region of the virtual image, as represented using XY chromaticity coordinates in an XYZ color representation system. In this figure, solid line B1 represents the color reproduction region of the image display apparatus 1 of this embodiment, that is, an image display apparatus including a display element 14 having color filters 24, a hologram optical element 18, and a light source 11 realized with an integrated RGB, 3-in-1 LED. Long-short dash line B2 represents the color reproduction region of an image display apparatus including a display element 14 having color filters 24, a hologram optical element 18, and a white light source (white LED).

Evenly broken line B3 represents the color reproduction region of an image display apparatus including a display element 14 having color filters 24, an eyepiece optical system that does not employ a hologram optical element 18, and a light source 11 realized with an integrated RGB, 3-in-1 LED. Long-short-short dash line B4 represents the color reproduction region of an image display apparatus including a display element 14 having color filters 24, an eyepiece optical system that does not employ a hologram optical element 18, and a white light source (white LED). One example of an eyepiece optical system that does not employ a hologram optical element 18 is a free-form-surfaced prism.

FIG. 9 shows that the color representation regions indicated by solid line B1 and long-short dash line B2 are broader than those indicated by evenly broken line B3 and long-short-short dash line B4. Based on this fact, it can be said that, in a case where a display element 14 having color filters 24 is used, by using it in combination with an eyepiece optical system 15 having a hologram optical element 18, and in addition setting the relationship between $\Delta\lambda 1$ and $\Delta\lambda 2$ as described above, it is possible to obtain enhanced color reproduction and hence a broader color reproduction region. In particular, by using an integrated RGB type as the light source 11 as indicated by solid line B1, it is possible to obtain higher color purity and hence a broader color reproduction region than when a white light source is used as the light source 11.

Moreover, as shown in FIG. 7, in this embodiment, whereas the peak transmissivity of the filters 24R to R light is 2%, the transmissivity of the same filters 24R to G light (in particular, G light in the wavelength band of the diffraction-efficiency half-peak wavelength width $\Delta\lambda 1_G$) is 0.2%. Setting the transmissivity of the filters 24R to G light, which has a high spectral luminous efficacy (or luminosity factor, as a measure of visual sensitivity), as low as one-tenth of their peak transmissivity to R light in this way helps enhance the color purity in R, and thus helps enhance the display quality of the image. This effect can surely be obtained particularly when the transmissivity of the filters 24R to G light is set smaller than one-tenth of their transmissivity to R light.

Accordingly, it can be said that, for higher color purity in R, the following condition needs to be fulfilled: let the transmissivity of the filters 24R to G light be TrG, and let the peak transmissivity of the same filters 24R to R light be TrP, then, for light incident on the hologram optical element 18 in the diffraction wavelength band (521±5 nm) thereof for green light, $TrG \leq TrP/10$.

Moreover, in this embodiment, a setting similar to that made with the filters 24R as described above is made also with the filters 24B. Specifically, whereas the peak transmissivity of the filters 24B to B light is 2%, the transmissivity of the same filters 24B to G light (in particular, G light in the wavelength band of the diffraction-efficiency half-peak wavelength width $\Delta\lambda 1_G$) is 0.2%. Setting the transmissivity of also the filters 24B to G light, which has a high spectral luminous efficacy (or luminosity factor), as low as one-tenth of their peak transmissivity to B light in this way helps enhance the color purity in B, and thus helps enhance the display quality of the image. This effect can be obtained surely particularly when the transmissivity of the filters 24B to G light is set smaller than one-tenth of their transmissivity to B light.

Accordingly, it can be said that, for higher color purity in B, the following condition needs to be fulfilled: let the transmissivity of the filters 24B to G light be TbG, and let the peak transmissivity of the same filters 24B to B light be TbP, then, for light incident on the hologram optical element 18 in the diffraction wavelength band (521±5 nm) thereof for green light, $TbG \leq TbP/10$.

Moreover, in this embodiment, the B, G, and R peak-diffraction-efficiency wavelengths $\lambda 1$ of the hologram optical element 18 are set to be within 20 nm, at most, of the B, G, and R peak-transmissivity wavelengths $\lambda 2$ of the color filters 24, and simultaneously within 10 nm, at most, of the B, G, and R peak light-intensity wavelengths $\lambda 3$ of the light source 11. Specifically, $\lambda 1_B$ is within the range of $\lambda 2_B \pm 20$ nm and simultaneously within the range of $\lambda 3_B \pm 10$ nm, $\lambda 1_G$ is within the range of $\lambda 2_G \pm 20$ nm and simultaneously within the range of $\lambda 3_G \pm 10$ nm, and $\lambda 1_R$ is within the range of $\lambda 2_R \pm 20$ nm and simultaneously within the range of $\lambda 3_R \pm 10$ nm.

Setting $\lambda 1$ within the range of $\lambda 2 \pm 20$ nm and simultaneously within the range of $\lambda 3 \pm 10$ nm in this way permits $\lambda 1$, already in a range close to $\lambda 2$, to be closer to $\lambda 3$. Thus, light emitted from the light source 11 with high intensity can be efficiently transmitted through the filters 24B, 24G, and 24R of the color filters 24 and diffracted by the hologram optical element 18. In this way, the observer can be presented with, as the virtual image, a bright color image that makes highly efficient use of the light from the light source 11.

5. Reduction of Wavelength Variation

Next, as the most distinctive feature of the present invention, how variation of the wavelengths of the light emitted from the light source 11 is reduced will be described by way of Practical Examples 1 and 2.

5-1. Practical Example 1

The image display apparatus 1 described above includes wavelength variation reducing means (a wavelength variation reduction mechanism) that reduces variation of the wavelengths of the light emitted from the light source 11. In this Practical Example, the wavelength variation reduction mechanism is realized as transmitting means (a transmitting mechanism, or a heat conducting member). The transmitting means transmits (rejects) the heat generated by and accumulated in the light source 11 to outside (for example, into the atmosphere). The transmitting means is realized with the casing 10 and with the circuit board 11a of the light source 11.

The casing 10 can be formed of, for example, resin such as ABS (acrylonitrile butadiene styrene) or PC (polycarbonate), or metal having a high thermal conductivity such as aluminum. The casing 10 has a holding portion 10a for holding the light source 11 or the circuit board 11a. In FIG. 1, hatching indicates the cross section of the holding portion 10a. The holding portion 10a is formed integral with the casing 10.

Here, the rate at which the heat accumulated in the light source 11 is transmitted to outside can be varied by appropriately setting, among others, the following parameters: the material (thermal conductivity) of the casing 10; the contact area between the light-emitting portions 11R, 11G, and 11B of the light source 11 and the circuit board 11a; the contact area between the circuit board 11a and the casing 10 (holding portion 11a); and the contact area of the copper foil conductors on the circuit board 11a and the atmosphere. In this Practical Example, the rate at which the heat accumulated in the light source 11 is transmitted to outside is set by setting those parameters so that the heat conduction rate from the light-emitting portions 11R, 11G, and 11B of the light source 11 to the circuit board 11a and the casing 10 is higher than that from the light-emitting portions 11R, 11G, and 11B to the atmosphere.

In this Practical Example, it is assumed that the light-emitting portions 11R, 11G, and 11B are made to emit light by passing constant currents therethrough so that their electric power consumption remains within their rated maximum electric power.

In this Practical Example, as shown in FIG. 1, the light-emitting portions 11R, 11G, and 11B of the light source 11 are fixed on the circuit board 11a, and the circuit board 11a is supported by the holding portion 10a of the casing 10. Thus, the heat that the light-emitting portions 11R, 11G, and 11B generate when emitting light is transmitted from the circuit board 11a via the holding portion 10a to the casing 10, and is then rejected therefrom into the atmosphere. Here, since the heat transmission rate from the light-emitting portions 11R, 11G, and 11B to the circuit board 11a and the casing 10 is higher than that from the light-emitting portions 11R, 11G, and 11B to the atmosphere as described above, heat is sufficiently dissipated from the light-emitting portions 11R, 11G, and 11B, and thus variation of the wavelengths of the emitted light is reduced.

Figure 10:
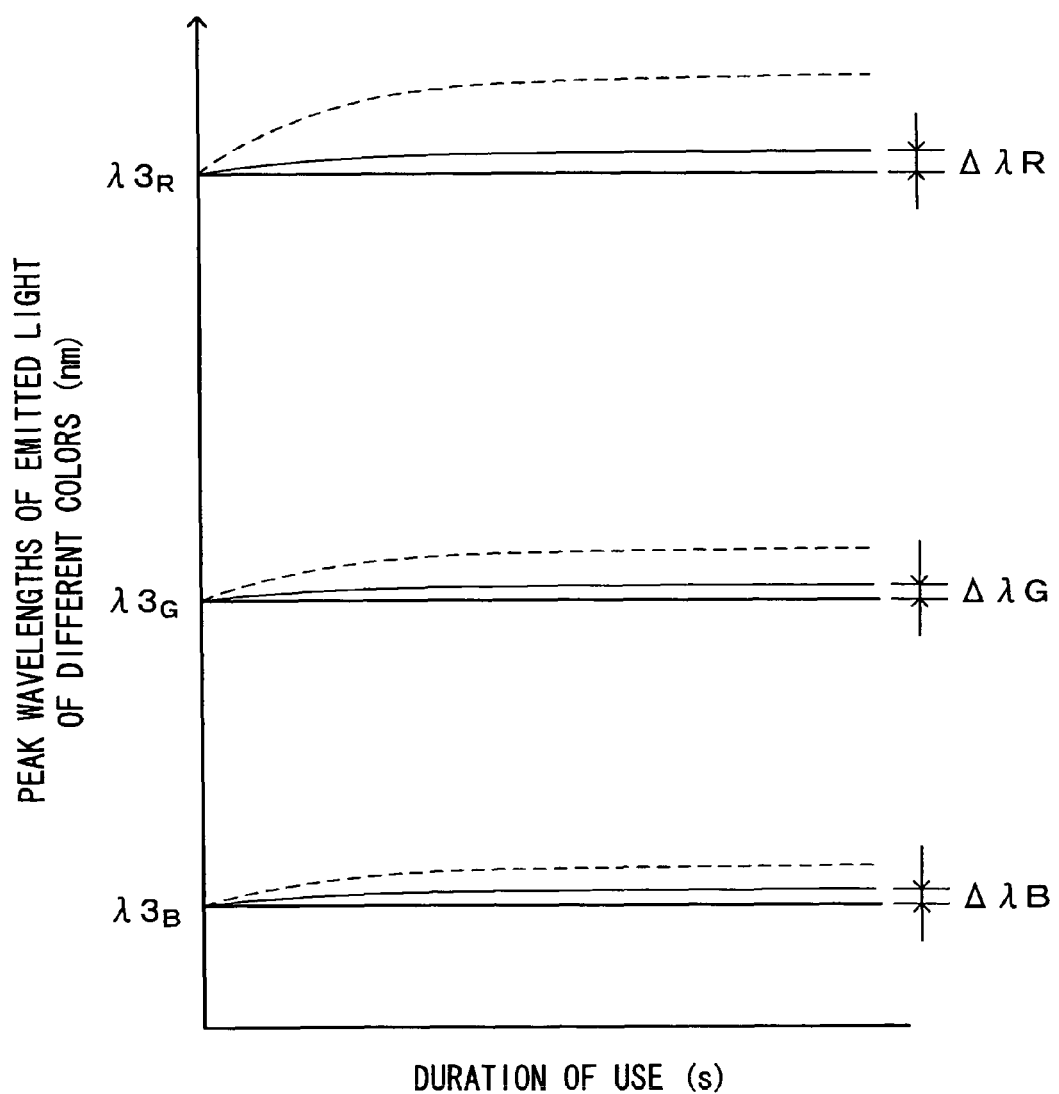
FIG. 10 is a diagram schematically illustrating how the wavelengths of the emitted RGB light vary with the duration of use of the above light source.

FIG. 10 is a diagram schematically illustrating how the wavelengths of the emitted RGB light vary with the duration of use of the above light source, as observed with two different settings of the rate at which the heat accumulated in the light source 11 is transmitted to outside. In the figure, solid lines represent wavelength variation of the emitted RGB light as observed when the heat accumulated in the light source 11 is transmitted to outside at a comparatively high rate, and broken lines represent wavelength variation of the emitted RGB light as observed when the heat accumulated in the light source 11 is transmitted to outside at a comparatively low rate.

Wavelength variation of the emitted RGB light depends on the ambient temperature and, in particular, on the temperature of the light-emitting portions 11R, 11G, and 11B. Thus, the horizontal axis of FIG. 10 can be thought of as representing the temperature of the light-emitting portions 11R, 11G, and 11B. The figure shows that, when the rate at which the heat accumulated in the light source 11 is transmitted to outside is set high, the rise in the temperature of the light-emitting portions 11R, 11G, and 11B is reduced, and the wavelength variation of the light emitted from the light source 11 is reduced. Let wavelength variations in the RGB light emitted from the light source 11 be $\Delta\lambda R$, $\Delta\lambda G$, and $\Delta\lambda B$, respectively, then, in the example represented by the solid lines, $\Delta\lambda=5$ nm, $\Delta\lambda G=2$ nm, and $\Delta\lambda B=2$ nm.

By setting the previously mentioned parameters so as to appropriately set the rate at which the heat accumulated in the light source 11 is transmitted to outside in this way, it is possible to reduce wavelength variation of the light emitted from the light source 11. Thus, it is possible to reduce deviation, resulting from heat accumulation in the light source 11, of the peak-intensity wavelengths $\lambda 3$ ($\lambda 3_R$, $\lambda 3_G$, and $\lambda 3_B$) of the light emitted from the light source 11 from the peak-diffraction-efficiency wavelengths $\lambda 1$ ($\lambda 1_R$, $\lambda 1_G$, and $\lambda 1_B$) of the hologram optical element 18. In this way, even in a case where a high-brightness light source is used as the light source 11, it is possible to diffract the light emitted from the light source 11 efficiently with the hologram optical element 18 to present a bright image. In addition, since wavelength variation of the light emitted from the light source 11 is reduced, it is possible to present an image with high color purity and high-grade color reproduction.

When the wavelengths of the light emitted from the light source 11 vary, the position of the pupil formed by the eyepiece optical system 15 may deviate among R, G, and B, causing the peak-light-intensity position to deviate among R, G, and B. If this happens, the observer cannot observe the presented image with correct colors. This inconvenience, however, can be avoided in this Practical Example, where wavelength variation of the light emitted from the light source 11 is reduced.

As indicated by broken lines in FIG. 10, when the rate at which the heat accumulated in the light source 11 is transmitted to outside is low, R light suffers a greater wavelength variation than G and B light. The volume-phase-type hologram optical element 18 exhibits higher wavelength selectivity to light of longer wavelengths, and the wavelength band ($\approx\Delta\lambda 3_R$) of the R light emitted from the light-emitting portion 11R is as narrow as about 20 nm. Hence, for R light, a variation in the light emitted from the light source 11 more tends to dim the diffracted light (image light) from the hologram optical element 18. Thus, by designing the casing 10 and the circuit board 11a as the wavelength variation reducing means and the transmitting means so as to reduce, in particular, wavelength variation of the R light emitted from the light source 11, it is possible to enhance the use efficiency of R light, which has a long wavelength, and thereby to present a bright image.

Moreover, in this Practical Example, the wavelength variation reducing means is realized as the transmitting means composed of the circuit board 11a on which the light source 11 is fixed and the casing 10 having the holding portion 10a for supporting the circuit board 11a. Thus, the heat accumulated in the light source 11 is surely transmitted via the transmitting means to outside. In this way, wavelength variation of the emitted light resulting from heat accumulation in light source 11 can be surely reduced.

Figure 11A:
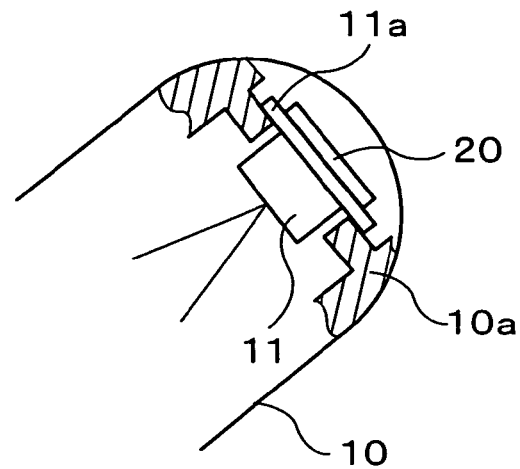
FIG. 11A is a cross-sectional view showing an example of the structure of transmitting means serving as wavelength variation reducing means provided in the above image display apparatus.
Figure 11B:
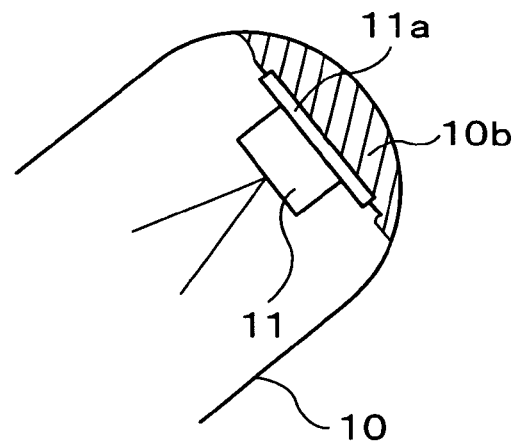
FIG. 11B is a cross-sectional view showing another example of the structure of the above transmitting means.
Figure 11C:
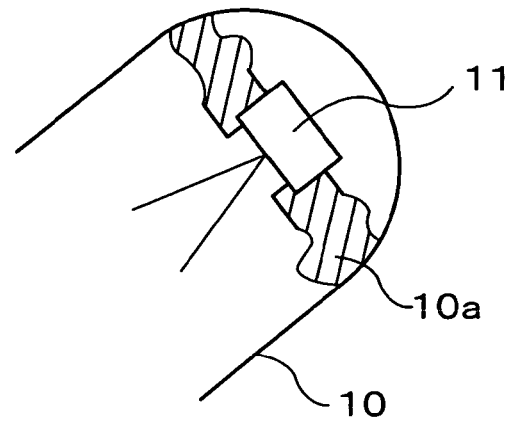
FIG. 11C is a cross-sectional view showing still another example of the structure of the above transmitting means.

The transmitting means serving as the wavelength variation reducing means may alternatively be structured as follows. FIGS. 11A to 11C are cross-sectional views showing other examples of the structure of the transmitting means.

In the example shown in FIG. 11A, a heat-sink plate 20 is firmly fitted on the back face of the circuit board 11a of the light source 11. The heat-sink plate 20 is formed of, for example, inexpensive metal with a high thermal conductivity such as copper (403 Wm$^{-1}$K$^{-1}$ at 0° C.) or aluminum (236 Wm$^{-1}$K$^{-1}$ at 0° C.). The heat-sink plate 20 is also shared as a member that fixes the circuit board 11a of the light source 11 to the casing 10 (holding portion 10a) and that reinforces their fixing together.

The use, as the transmitting means, of the heat-sink plate 20 with a high thermal conductivity in addition to the circuit board 11a and the casing 10 permits the heat accumulated in the light source 11 to be rejected into the atmosphere not only via the circuit board 11a and the casing 10 but also via the heat-sink plate 20. Thus, it is possible to reduce wavelength variation of the light emitted from the light source 11 more effectively than with the structure shown in FIG. 1. It has been experimentally confirmed that, with this structure, wavelength variation of the light emitted from the light source 11 can be reduced to as small as about 3 nm for R light, which suffers the greatest wavelength variation.

In the example shown in FIG. 11B, the circuit board 11a of the light source 11 is fixed on a holding portion 10b of the casing 10. The holding portion 10b is so formed as to have a larger contact area with the circuit board 11a than the holding portion 10a shown in FIGS. 1 and 11A.

Realizing the transmitting means with the casing 10 and the holding portion 10b in this way permits the heat accumulated in the image display apparatus 1 to be rejected to outside faster via the holding portion 10b and the casing 10 than with the structures shown in FIGS. 1 and 11A. This helps further reduce wavelength variation of the light emitted from the light source 11.

In the example shown in FIG. 11C, the light source 11 is fixed to the holding portion 10a of the casing 10 so that they make direct contact with each other. With this structure, the direct contact between the light source 11 and the holding portion 10a serving as the transmitting means permits the heat accumulated in the light source 11 to be rejected to outside quickly via the holding portion 10a and the casing 10. Thus, it is possible to reduce wavelength variation of the light emitted from the light source 11. This effect can surely be obtained particularly when the casing 10 is formed of a material with a high thermal conductivity.

This Practical Example has been described as being so constructed that the light source 11 emits light having intensity peaks at wavelengths corresponding to three primary colors, namely R, G, and B. Since, according to the present invention, wavelength variation of the light emitted from a light source 11 is reduced by wavelength variation reducing means, in a case where a light source 11 is used that emits light of three colors, namely R, G, and B, it is possible to reduce variation of the white balance of the color image presented.

Needless to say, the present invention is applicable also in a case where a light source 11 is used that emits light of a single color. Specifically, the light emitted from the light source 11 may be, for example, of a single color of R, G, or B. The light source 11 may be so designed as to emit light having intensity peaks at a plurality of wavelengths (light of at least two colors). Specifically, the light emitted from the light source 11 may be, for example, of two of the R, G, and B colors. In this case, when the light emitted from the light source 11 is modulated with the display element 14 and is then directed through the eyepiece optical system 15 to the observer's eye, the observer can observe a color image.

Based on the foregoing, it can be said that the present invention can be applied to any light source 11 that has an intensity peak at a particular wavelength. On the other hand, since the hologram optical element 18 needs to have a diffraction-efficiency peak at a wavelength corresponding to the intensity peak of the light emitted from the light source 11, for example, in a case where the light emitted from the light source 11 has an intensity peak only at the wavelength of R, the hologram optical element 18 needs to have a diffraction efficiency peak at the wavelength of R, and, in a case where the light emitted from the light source 11 has intensity peaks only at the wavelengths of R and G, the hologram optical element 18 needs to have diffraction efficiency peaks at the wavelengths of R and G.

To effectively dissipate (reject) the heat generated by the light source 11, it is preferable that the transmitting means (part or all of the components that contribute to the dissipation of heat, including the holding portions 10a and 10b, the circuit board 11a, the heat-sink plate 20, and the casing 10) have a thermal conductivity of 100 Wm$^{-1}$K$^{-1}$ or more. Even when the casing 10 itself and the circuit board 11a are formed of a material with a comparatively low thermal conductivity such as resin, so long as the holding portions 10a and 10b and the heat-sink plate 20 have a thermal conductivity of 100 Wm$^{-1}$K$^{-1}$ or more, the desired effect can be obtained. Examples of materials with a thermal conductivity of 100 Wm$^{-1}$K$^{-1}$ or more include, to name a few, copper (403 Wm$^{-1}$K$^{-1}$), aluminum (236 Wm$^{-1}$K$^{-1}$), brass (106 Wm$^{-1}$K$^{-1}$), silver (428 Wm$^{-1}$K$^{-1}$), and gold (319 Wm$^{-1}$K$^{-1}$).

In a case where the transmitting means is formed of resin, the resin may be mixed with carbon fiber so that its thermal conductivity is raised to 100 Wm$^{-1}$K$^{-1}$ or more. The resin may be mixed instead with glass fiber; this too helps raise its thermal conductivity at least compared with its own thermal conductivity.

The heat generated by the light source 11 can be dissipated more effectively by enlarging (increasing the area of) the copper foil conductors on the circuit board 11a on which the light-emitting portions 11R, 11G and 11B of the light source 11 are mounted. For more effective heat rejection, it is possible even to provide an insulating layer on an aluminum surface, then lay copper conductors on the insulating layer, and then mount the LED on the copper conductors.

5-2. Practical Example 2

Next, another example of the construction of the wavelength variation reducing means according to the present invention will be described. In this Practical Example, the wavelength variation reducing means is realized with the control portion 19 shown in FIG. 1. Specifically, the control portion 19 reduces wavelength variation of the emitted light by controlling the magnitudes of the electric currents supplied to the light-emitting chips (light-emitting portions 11R, 11G and 11B) of the light source 11 and the timing with which they are supplied. More specifically, the control portion 19 performs control as described below.

Figure 12A:
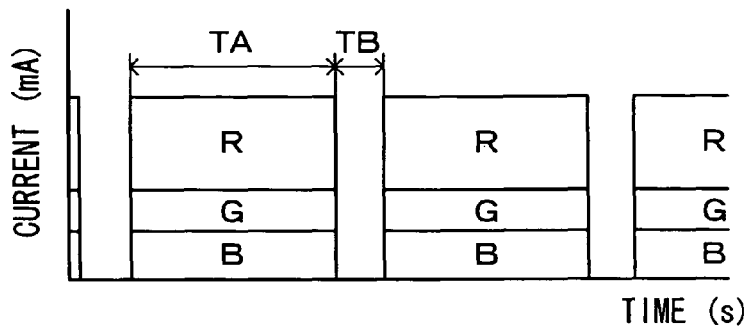
FIG. 12A is a graph showing one of various examples of how the supply of electric currents to individual light-emitting portions is controlled by a control portion servings as the wavelength variation reducing means provided in the above image display apparatus.
Figure 12B:
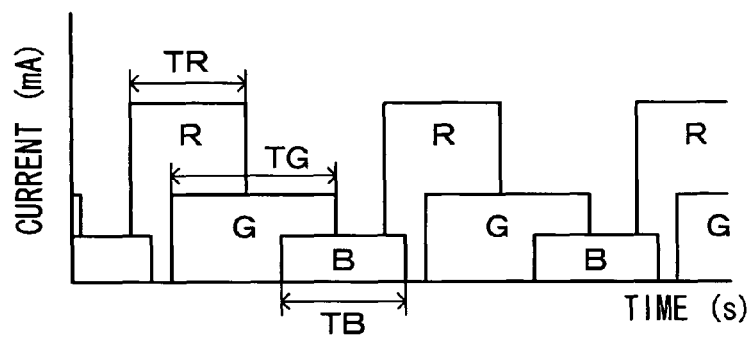
FIG. 12B is a graph showing another of the above various examples.
Figure 12C:
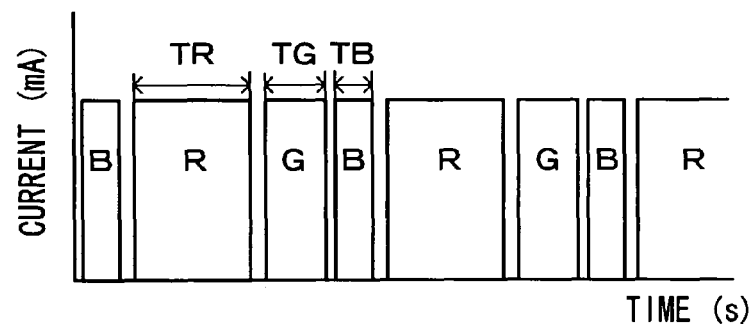
FIG. 12C is a graph showing still another of the above various examples.

FIGS. 12A to 12C are graphs showing various examples of how the supply of electric currents to the light-emitting portions 11R, 11G, and 11B is controlled by the control portion 19. In FIGS. 12A to 12C, the horizontal axis represents the lapse of time (s), and the vertical axis represents the electric currents (mA) passed through the light-emitting portions 11R, 11G, and 11B.

In the example shown in FIG. 12A, the control portion 19 passes electric currents through the light-emitting portions 11R, 11G, and 11B in such a way that light emission periods TA during which the light-emitting portions 11R, 11G, and 11B are all supplied with electric currents so that they emit light simultaneously alternate with heat rejection periods TB during which none of the light-emitting portions 11R, 11G, and 11B is supplied with an electric current so that heat is rejected, and in addition that the light emission periods TA are longer than the heat rejection periods TB.

As a result of the control portion 19 controlling in this way, even when the light-emitting portions 11R, 11G, and 11B emit light simultaneously during the light emission periods TA, the heat accumulated in the light source 11 is surely rejected during the heat rejection periods TB. Thus, it is possible to surely reduce wavelength variation of the emitted light resulting from heat accumulation in the light source 11. Moreover, since the light emission periods TA are longer than the heat rejection periods TB, it is possible to present the observer with a bright image.

In the example shown in FIG. 12B, the control portion 19 passes electric currents through the light-emitting portions 11R, 11G, and 11B in such a way that periods TR, TG, and TB during which the light-emitting portions 11R, 11G, and 11B respectively emit light are shifted from one another so that at least one of them does not emit light at any time. In this control, there may be provided periods during which none of the light-emitting portions 11R, 11G, and 11B emits light.

As a result of the control portion 19 controlling in this way, there exists no period during which the three light-emitting portions 11R, 11G, and 11B all emit light simultaneously. This helps reduce the heat itself accumulated in the light source 11, and, even the heat accumulated in the light source 11 is rejected while, for example, only one of the three light-emitting portions 11R, 11G and 11B is emitting light. Thus, with this control too, it is possible to surely reduce wavelength variation of the emitted light resulting from heat accumulation in the light source 11.

In the example shown in FIG. 12C, the control portion 19 controls in such a way that the light-emitting portions 11R, 11G, and 11B emit light one after another so that periods during which they respectively emit light do not overlap with one another, and that, after any of the light-emitting portions 11R, 11G, and 11B emits light, that light-emitting portion (for example, the light-emitting portion 11R) is supplied with no electric current for a period required for heat rejection therefrom.

With this control, no two or more of the light-emitting portions 11R, 11G, and 11B emit light simultaneously. Moreover, after any of the light-emitting portions 11R, 11G, and 11B emits light, that light-emitting portion is supplied with no electric current for a period required for heat rejection therefrom. Thus, for each light-emitting portion that has just emitted light, heat is surely rejected therefrom. In this way, it is possible to surely reduce wavelength variation of the emitted light resulting from heat accumulation in the light source 11.

Moreover, since no two or more of the light-emitting portions 11R, 11G, and 11B emit light simultaneously, the electric currents passed therethrough can be increased up to the rated maximum electric currents. In addition, since the supply of electric currents to the light-emitting portions 11R, 11G, and 11B is stopped only for the minimum period required for heat rejection therefrom, the light-emitting portions 11R, 11G, and 11B can be kept emitting light for as long periods as possible. Thus, it is possible to present a bright image.

The methods of control shown in FIGS. 12A and 12C are applicable in cases where the light source 11 has a plurality of light-emitting portions that respectively emit light having intensity peaks at predetermined wavelengths. That is, with the control shown in FIG. 12A or 12C, the above-described effect of the present invention can be obtained in a case where, for example, the light source 11 emits light of two of the R, G, and B colors simultaneously.

Figure 12D:
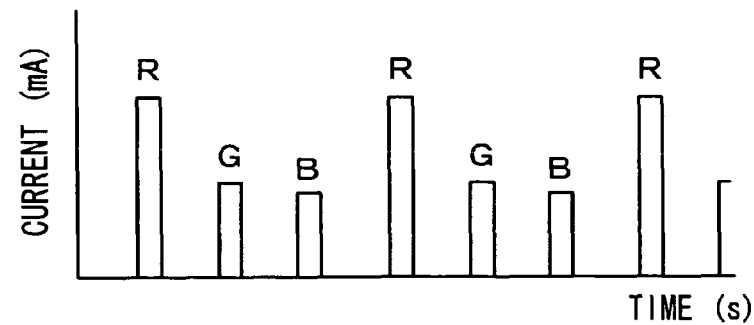
FIG. 12D is a graph showing how the RGB light-emitting portions for illuminating the above display element are generally controlled in an image display apparatus employing a display element of the type that is driven on a time-division basis.

For comparison with the present invention, FIG. 12D shows how the RGB light-emitting portions for illuminating the display element are generally controlled in an image display apparatus employing a display element of the type that is driven on a time-division basis. Where a display element that is driven on a time-division basis is used, the R, G, and B light emitted from the R, G, and B light-emitting portions needs to be fed to the display element one color at a time on a time-division basis. Here, since the display element requires some time to be ready to modulate incident light, the R, G, and B light-emitting portions can each emit light only for a period about one-tenth of the length of one field. Moreover, there is a limit to the electric currents that can be passed through the R, G, and B light-emitting portions. Thus, where a display element that is driven on a time-division basis is used, it is generally difficult to present a bright image.

In contrast, where a display element 14 having color filters is used as in the image display apparatus 1 according to the present invention, wavelength variation of the light emitted from the light source 11 can be reduced with the wavelength variation reducing means described above. Thus, it is possible to use a high-brightness light source 11 and present a bright image.

5-3. Degree to which Wavelength Variation is Reduced

With the wavelength variation reducing means of Practical Example 1 or 2 described above, wavelength variation of the light emitted from the light source 11 can be reduced. Let any peak-intensity wavelength of the light emitted from the light source 11 be $\lambda L$ (nm), and let the corresponding peak-diffraction-efficiency wavelength of the hologram optical element 18 be $\lambda H$ (mm), then it is preferable that the wavelength variation reducing means reduce wavelength variation of the light emitted from the light source 11 such that $\lambda H - 10 \text{ nm} \leq \lambda L \leq \lambda H + 10 \text{ nm}$.

Here, since $\lambda L = \lambda 3$ and $\lambda H = \lambda 1$, the above conditional formula can be rewritten as $\lambda 1_R - 10 \text{ nm} \leq \lambda 3_R \leq \lambda 1_R + 10 \text{ nm}$, $\lambda 1_G - 10 \text{ nm} \leq \lambda 3_G \leq \lambda 1_G + 10 \text{ nm}$, and $\lambda 1_B - 10 \text{ nm} \leq \lambda 3_B \leq \lambda 1_B + 10 \text{ nm}$.

For the wavelength variation reducing means to be able to reduce wavelength variation of the emitted light so as to fulfill the above conditional formulae, either the relevant parameters associated with the material (thermal conductivity) of the casing 10 etc. are set appropriately as described previously in connection with Practical Example 1, or the lengths of the light emission and heat rejection periods and the magnitudes of the electric currents passed through the light-emitting portions 11R, 11G, and 11B of the light source 11 are set appropriately in the methods described previously in connection with Practical Example 2.

When the wavelength variation reducing means can reduce wavelength variation of the emitted light so as to fulfill the above conditional formulae, the difference between $\lambda L$ ($=\lambda 3$) and $\lambda H$ ($=\lambda 1$) can be kept small. This makes it possible to obtain high-grade color reproduction, and to present a bright image efficiently by use of a light source 11 that has a narrow intensity half-peak wavelength width, for example as narrow as about 20 nm.

Here, if the diffraction-efficiency half-peak wavelength width ($\Delta \lambda 1$) of the hologram optical element 18 is 20 nm or less, it is possible to present an image with high color purity, and in addition the hologram optical element 18 transmits the outside light with high transmissivity. Thus, in a case where, as in this embodiment, a hologram optical element 18 is used as a combiner that directs the image light from a display element 14 and outside light simultaneously to an observer's eye, the observer can, while observing a presented image with high color purity, observe a bright outside image.

It is further preferable that the wavelength variation reducing means reduce wavelength variation of the light emitted from the light source 11 such that $$\lambda H-5 \text{ nm} \leq \lambda L \leq \lambda H+5 \text{ nm}.$$

That is, it is further preferable that, as by appropriately setting the relevant parameters as described above, the wavelength variation reducing means reduce wavelength variation of the light emitted from the light source 11 such that $$\lambda 1_R-5 \text{ nm} \leq \lambda 3_R \leq \lambda 1_R+5 \text{ nm},$$

$$\lambda 1_G-5 \text{ nm} \leq \lambda 3_G \leq \lambda 1_G+5 \text{ nm},$$

$$\lambda 1_B-5 \text{ nm} \leq \lambda 3_B \leq \lambda 1_B+5 \text{ nm},$$

This helps keep the difference between λL and λH smaller, and thus helps obtain extremely high-grade color reproduction. Moreover, as in this embodiment, by use of a hologram optical element 18 having a diffraction-efficiency half-peak wavelength width (Δλ1) of about 10 nm, it is possible to present a bright image highly efficiently.

With a hologram optical element 18 having a diffraction-efficiency half-peak wavelength width (Δλ1) of about 10 nm or less, it is possible to present an image with extremely high color purity, and in addition the hologram optical element 18 transmits outside light with extremely high transmissivity. Thus, in a case where a hologram optical element 18 is used as a combiner, the observer can, while observing a presented image with extremely high color purity, observe an extremely bright outside image.

If the above-mentioned half-peak wavelength width (Δλ1) is less than 5 nm, however, the diffraction wavelength width is too narrow to diffract a sufficient amount of light. This may make the observed image unduly dim. Accordingly, for a proper balance between image brightness and color purity, it is preferable that this half-peak wavelength width (Δλ1) be set at 5 nm or more but 10 nm or less. That is, when this half-peak wavelength width (Δλ1) is in the just mentioned range, it is possible to obtain satisfactory image brightness and satisfactory color purity simultaneously.

6. Effect of Reducing Color Unevenness

In this embodiment, as described earlier, the optical pupil E is sized 6 mm in the X direction and 2 mm in the Y direction. That is, the optical pupil E is larger in the X direction, which is the direction perpendicular to the plane of incidence (the YZ plane) along which the optical axis runs onto the hologram optical element 18, than in the Y direction, which is the direction parallel to the plane of incidence. Setting the size of the optical pupil E in this way enables the observer to observe a high-quality image with little color unevenness without being much influenced by the wavelength characteristics (wavelength selectivity) of the hologram optical element 18. The reason is as follows.

First, the relationship between the angle of incidence at the hologram optical element 18 and the wavelength selectivity thereof will be explained. A hologram optical element 18 having interference fringes that diffract light traveling at angles of incidence of more than zero degrees exhibits lower wavelength selectivity in the direction perpendicular to the plane of incidence than in the direction parallel to the plane of incidence (produces smaller deviations in diffraction wavelength resulting from deviations in angle of incidence). Put in another way, it exhibits lower angle selectivity to a deviation in angle of incidence with respect to the interference fringes in the direction perpendicular to the plane of incidence than in the direction parallel to the plane of incidence. This is because, when light is incident on the interference fringes of the hologram optical element 18 at angles of incidence other than zero degrees, a deviation in angle of incidence within the plane of incidence (the YZ plane) behaves as a deviation in angle of incidence as large as it actually is, and therefore greatly influences the diffraction wavelength; by contrast, a deviation in angle of incidence in the direction perpendicular to the plane of incidence behaves as a deviation in angle of incidence smaller than it actually is, and therefore only slightly influences the diffraction wavelength.

Accordingly, when light is incident on the interference fringes of the hologram optical element 18 at an angle of incidence deviated from the intended angle, the same deviation in angle produces a larger deviation in diffraction wavelength if the deviation is in the direction parallel to the plane of incidence than if it is in the direction perpendicular to the plane of incidence (that is, the wavelength selectivity is higher in the direction parallel to the plane of incidence).

Figure 13:
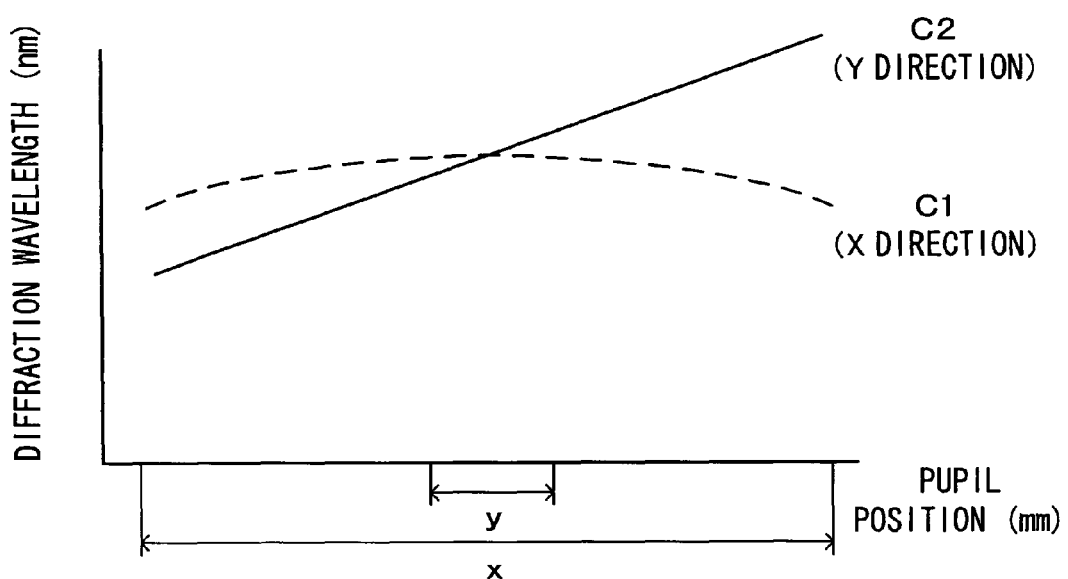
FIG. 13 is a diagram illustrating the relationship between the pupil position in the optical pupil and a principal diffraction wavelength.

FIG. 13 is a diagram illustrating the relationship between the pupil position in the optical pupil E and the principal diffraction wavelength (for example, that of R light). In the figure, broken line C1 represents variation in the diffraction wavelength in the X direction of the optical pupil E, and solid line C2 represents variation in the diffraction wavelength in the Y direction of the optical pupil E. As this figure shows, the diffraction wavelength varies more in the Y direction, which is parallel to the plane of incidence, than in the X direction, which is perpendicular to the plane of incidence.

Thus, by forming the optical pupil E smaller in the Y direction, in which the diffraction wavelength varies more, it is possible to narrow the range over which the diffraction wavelength varies, and thereby to reduce color unevenness at the optical pupil E. On the other hand, even when the optical pupil E is formed larger in the direction perpendicular to the plane of incidence, it is still possible to present the observer with an image with high color purity. In addition, in this embodiment, since the wavelength variation reducing means reduces wavelength variation of the light emitted from the light source 11 attributable to the duration of use and the ambient temperature of use, it is possible to present a bright image with high color purity irrespective of the duration of use or the ambient temperature of use.

For light that does not travel along the plane of incidence of the optical axis, the plane of incidence (the plane including both the rays incident on the hologram optical element 18 and the rays emergent therefrom) is slightly deviated from being parallel. Even then, since, as described above, a deviation in angle in the direction perpendicular to the plane of incidence only slightly influences the diffraction wavelength, using the plane of incidence of the optical axis as a reference does not lead to increased color unevenness.

In the X direction, which is perpendicular to the plane of incidence of the optical axis, since the light from the light source 11 is diffused by the one-way diffuser plate 12, the light source 11 is not conjugate with the optical pupil; in contrast, in the Y direction, which is parallel to the plane of incidence of the optical axis, the light source 11 is conjugate with the optical pupil. This helps increase the light use efficiency of the light source 11, and thus helps present an image with high-grade color reproduction.

Moreover, as described earlier, the three light-emitting portions 11R, 11G, and 11B of the light source 11 are arranged side by side in the X direction, in which the one-way diffuser plate 12 exhibits a higher degree of diffusion. This is to say that the three light-emitting portions 11R, 11G, and 11B are arranged side by side in the direction perpendicular to the plane of incidence of the optical axis. The direction perpendicular to the plane of incidence is the one in which the hologram optical element 18 exhibits low wavelength selectivity, and therefore arranging the three light-emitting portions 11R, 11G, and 11B in the X direction permits the different colors to be mixed in the direction in which the optical pupil E can be enlarged. Thus, even when a light source 11 is used that emits light of three colors, namely R, G, and B, it is possible to present the observer with a high-quality image with little color unevenness.

Embodiment 2

Another embodiment of the present invention will be described below with reference to the accompanying drawings. Such components, structures, etc. of Embodiment 2 as are found also in Embodiment 1 will be identified with common reference numerals and symbols, and no explanations thereof will be repeated.

Figure 14:
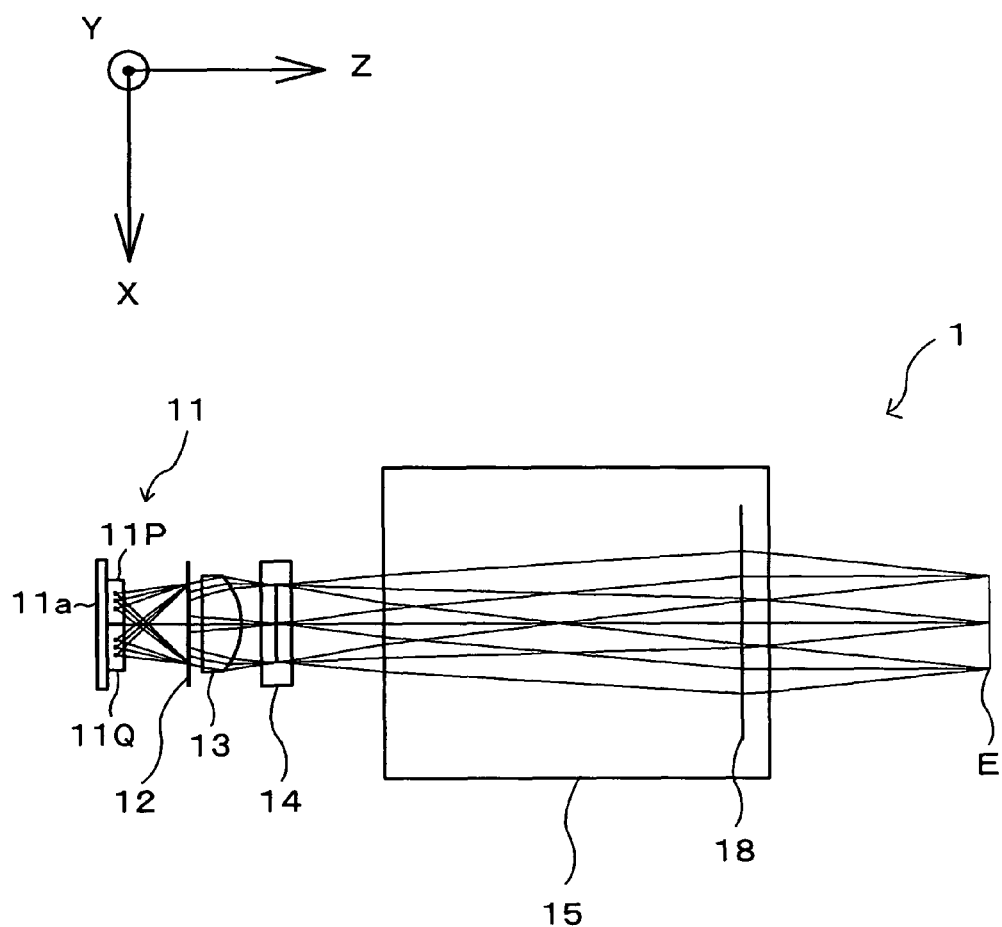
FIG. 14 is a diagram illustrating the optical paths in an image display apparatus as another embodiment of the present invention, as optically unfolded in one direction.

FIG. 14 is a diagram illustrating the optical paths in the image display apparatus 1 of this embodiment, as optically unfolded in one direction. In this embodiment, the light source 11 is composed of two light source groups 11P and 11Q. In other respects, the construction here is similar to that in Embodiment 1. Thus, the image display apparatus 1 of this embodiment is provided with the wavelength variation reducing means described previously in connection with Embodiment 1.

Figure 15:
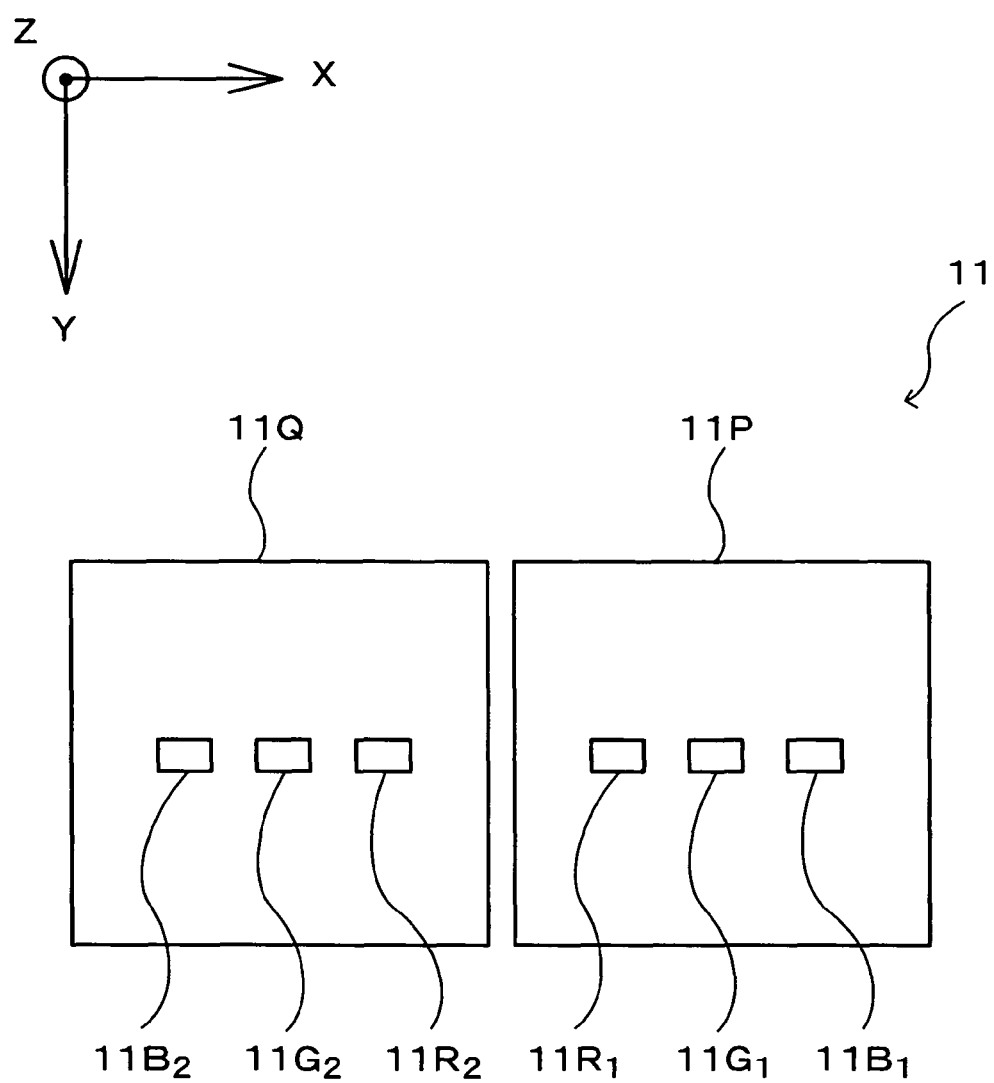
FIG. 15 is a plan view of the light source provided in the above image display apparatus, as seen from the display element side.

FIG. 15 is a plan view of the light source 11 in this embodiment, as seen from the display element 14 side. In the light source 11, the light source group 11P is realized with an integrated RGB LED having three light-emitting portions $11R_1$, $11G_1$, and $11B_1$ that respectively emit light of three colors, namely R, G, and B. Likewise, the light source group 11Q is realized with an integrated RGB LED having three light-emitting portions $11R_2$, $11G_2$, and $11B_2$ that respectively emit light of three colors, namely R, G, and B. That is, the light source 11 has two groups of three light-emitting portions emitting R, G, and B light.

The light-emitting portions of the light source groups 11P and 11Q are arranged side by side in the direction perpendicular to the plane of incidence (the YZ plane) along which the optical axis runs onto the hologram optical element 18, and are in addition so arranged as to be plane-symmetric with respect to the plane of incidence in terms of their colors. More specifically, the light-emitting portions $11R_1$ and $11R_2$ are arranged closest to the plane of incidence and plane-symmetrically with respect thereto, the light-emitting portions $11G_1$ and $11G_2$ are arranged more outward along the X direction and plane-symmetrically with respect to the plane of incidence, and the light-emitting portions $11B_1$ and $11B_2$ are arranged still more outward along the X direction and plane-symmetrically with respect to the plane of incidence. That is, the light-emitting portions are so arranged that they emit light of increasingly short wavelengths as one goes outward along the X direction away from the plane of incidence.

Arranging the light-emitting portions plane-symmetrically with respect to the plane of incidence in terms of their colors in this way permits, for each of the R, G, and B colors, the center of gravity of the total light intensity, which is the sum of the light intensities of the light emitted from the two light-emitting portions (for example, $11R_1$ and $11R_2$) for that color, to be located within the plane of symmetry (the plane of incidence). That is, it is possible to obtain, for each of the R, G, and B colors, an intensity distribution that is symmetric in the X direction with respect to the plane of symmetry. This makes it possible to present the observer with an image with little color unevenness at the center of the optical pupil E.

The plane with respect to which the light-emitting portions are arranged plane-symmetrically may be a plane parallel to the plane of incidence. That is, the plane with respect to which the light-emitting portions are arranged plane-symmetrically may be a plane slightly deviated in the X direction from the plane of incidence. In that case, it is possible to present the observer with an image with little color unevenness near the center of the optical pupil E.

Where the light source 11 is composed of two light source groups and their light-emitting portions are arranged plane-symmetrically in terms of their colors, the order in which the light-emitting portions are arranged within each group in the direction perpendicular to the plane of incidence is reversed between adjacent groups. Even where the light source 11 is composed of an even number, four or greater, of groups of R, G, and B light-emitting portions, by reversing, between adjacent groups, the order in which the light-emitting portions are arranged within each group in the direction perpendicular to the plane of incidence, it is possible to locate, for each of the R, G, and B colors, the center of gravity of the total light intensity, which is the sum of the light intensities of the light emitted from the light-emitting portions for that color, within the plane (including the plane of incidence), the same among the different colors, parallel to the plane of incidence. Thus, it is possible to present the observer with an image with little color unevenness at or near the center of the optical pupil E.

To sum up, so long as the light source 11 has an even number, two or greater, of groups of three, namely R, G, and B, light-emitting portions and the order in which the light-emitting portions are arranged within each group in the direction perpendicular to the plane of incidence is reversed between adjacent groups, it is possible to present the observer with an image with little color unevenness at or near the center of the optical pupil E.

Moreover, even where the light source 11 is composed of an even number, four or more, of light source groups, so long as the light-emitting portions are arranged plane-symmetrically with respect to the plane of incidence and in such a way that the light-emitting portions located on opposite sides of and at an equal distance from the plane of incidence in the direction perpendicular thereto emit light of the same color, for each of the colors of the light emitted from the light-emitting portions, the center of gravity of the light intensity lies on the plane of incidence, coinciding among the different colors. Thus, it can be said that, where the light source 11 is composed of an even number of light source groups, by arranging the light-emitting portions as described above, it is possible to present the observer with an image with little color unevenness at the center of the optical pupil.

As described earlier, the hologram optical element 18 is so fabricated as to diffract the image light in wavelength bands of 465±5 nm, 521±5 nm, and 634±5 nm as represented in terms of their respective peak-diffraction-efficiency wavelengths and diffraction-efficiency half-peak wavelength widths. Since the diffraction-efficiency half-peak wavelength widths Δλ1 for the different colors are equal in this way, the longer the wavelength of light, the higher the angle selectivity it suffers (the smaller the deviation in angle of incidence resulting from a variation in wavelength). Thus, in the light source groups 11P and 11Q, arranging the light-emitting portions in such order that they emit light of increasingly short wavelengths as one goes outward along the X direction away from the plane of incidence helps reduce intensity differences among the different colors within the optical pupil E, and thus helps present the observer with an image with little color unevenness within the optical pupil E. How this is achieved will be described in detail below.

Let the peak-diffraction-efficiency wavelength be λ, the index of refraction of the medium (interference fringes) of the hologram optical element 18 be n, the thickness of the medium be h, and the angle of incidence be θ, then these parameters fulfills $$\lambda = 2nh \cos \theta.$$

Now, suppose that, for B light, having a short wavelength, and R light, having a long wavelength, their wavelengths are deviated by the same amount, for example, 5 nm. Then, the proportions of the variations in their wavelengths are, for B light, 465/470 and, for R light, 634/639. That is, compared in terms of proportion, the variation in the wavelength of R light is smaller than the variation in the wavelength of B light. Thus, for a given variation in wavelength, R light, having a long wavelength, produces a smaller deviation in angle of incidence θ (suffers higher angle selectivity) than B light, having a short wavelength. Hence, when the R, G, and B wavelength widths of the light emitted from the light source 11 are equal, the optical pupil formed by the light being diffracted by the hologram optical element 18 is smaller the longer the wavelength of light. Here, the optical pupil E is assumed to include the ranges of the optical pupils of all the colors.

On the other hand, the intensity of the light emitted from the LEDs (light-emitting portions) of the light source 11 is, generally, increasingly high toward the center and increasingly low toward the edge. Moreover, although in the Y direction the light-emitting portions are arranged so as to be substantially conjugate with the optical pupil, in the X direction, since the light therefrom is diffused by the one-way diffuser plate 12, they are not conjugate with the optical pupil. Even then, the position in the optical pupil where light intensity is highest is approximately the same as the position that would be conjugate with the light-emitting portions were the one-way diffuser plate 12 not provided.

Thus, by locating the pupil center of long-wavelength light (R light), which forms a small optical pupil, close to the center of the optical pupil E, and locating the pupil center of short-wavelength light (B light), which forms a large optical pupil, away from the center of the optical pupil E, it is possible to reduce, for each color, the intensity difference depending on the pupil position within the optical pupil E. This will be described in more detail below.

Figure 16:
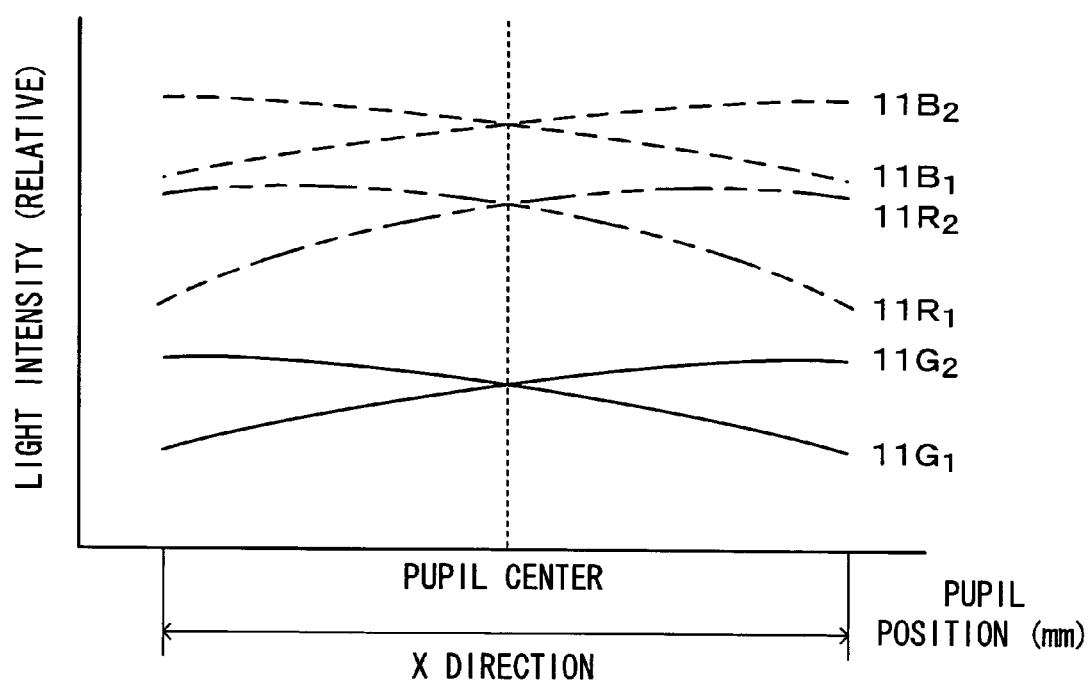
FIG. 16 is a diagram illustrating the relationship between the pupil position in the optical pupil in the X direction and light intensity.

FIG. 16 is a diagram illustrating the relationship between the pupil position in the optical pupil in the X direction and light intensity. Light intensity is given in relative terms for each color. In the figure, the curves indicated by $11R_1$, $11R_2$, $11G_1$, $11G_2$, $11B_1$, and $11B_2$ correspond to the light emitted from the light-emitting portions $11R_1$, $11R_2$, $11G_1$, $11G_2$, $11B_1$, and $11B_2$, respectively.

As described above, owing to the angle selectivity of the hologram optical element 18, the longer the wavelength, the smaller the optical pupil. Thus, as shown in FIG. 16, the longer the wavelength of light, the greater the difference in intensity depending on the pupil position (the greater the difference in intensity between at the center and at the edge of the optical pupil E). Put the other way around, the shorter the wavelength, the larger the optical pupil E; hence, the shorter the wavelength of light, the smaller the difference in intensity depending on the pupil position.

Moreover, since the light-emitting portions are so arranged that those emitting light of longer wavelengths are closer to the plane of incidence of the optical axis, the position at which light intensity is high is located closer to the center of the optical pupil E the longer the wavelength of light. By contrast, since the light-emitting portions are so arranged that those emitting light of shorter wavelengths are farther away from the plane of incidence of the optical axis, the position at which light intensity is high is located near the edge of the optical pupil E.

That is, by arranging the light-emitting portions in such order that the longer the wavelength of light, the greater the difference in intensity depending on the pupil position but that they emit light of increasingly short wavelengths as one goes outward along the X direction away from the plane of incidence of the optical axis, and thereby brining the high-light-intensity position closer to the center of the optical pupil E the longer the wavelength of light, it is possible, for long-wavelength light, to reduce the difference in intensity depending on the pupil position, that is, the difference in intensity between at the center and at the edge of the optical pupil E. In this way, it is possible to present the observer with an image with little color unevenness over the entire optical pupil E (at the center and at the edge thereof).

Moreover, since the light-emitting portions of the light source groups 11P and 11Q are arranged in the X direction in increasing order of the degree of diffusion that light of the corresponding wavelengths undergoes (the shorter the wavelength of light, the higher the degree of diffusion it undergoes), it is possible to further reduce, for each color, the difference in intensity within the optical pupil E, and thereby to further reduce color unevenness. That is, it is possible to present the observer with an image with high color purity.

Figure 17:
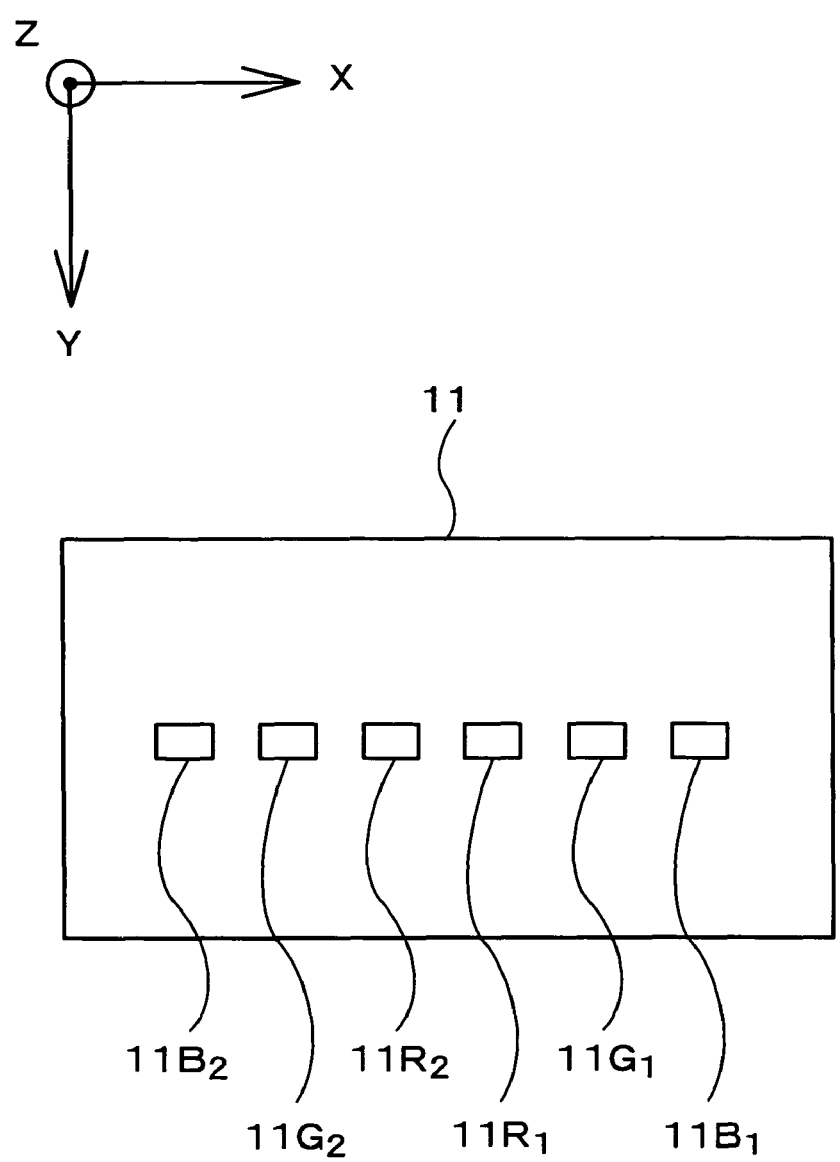
FIG. 17 is a diagram showing another example of the structure of the above light source, the diagram being a plan view of the above light source as seen from the display element side.

The above description deals with an example where the light source 11 is composed of light source groups 11P and 11Q, which are two groups of R, G, and B light-emitting portions, with each group built into a single package. Alternatively, the two groups may be built into a single package. FIG. 17 shows another example of the structure of the light source 11, in a plan view thereof as seen from the display element 14 side.

Thus, the light source 11 may be composed of light-emitting portions $11R_1$, $11R_2$, $11G_1$, $11G_2$, $11B_1$, and $11B_2$ built into a single package. With this structure too, by applying the above-described arrangement of the light-emitting portions, it is possible to reduce, for each color, the difference in intensity within the optical pupil E, and thereby to reduce color unevenness. The closer together the light-emitting points are located, the easier it is for the R, G, and B colors to mix, and hence the brighter the presented image can be made. Thus, in this respect, the structure shown in FIG. 17 is preferable, because, with it, it is easier to arrange the light-emitting portions closer together.

When the light-emitting portions are arranged close together as shown in FIG. 17, the light source 11 tends to accumulate more heat, and thus the light source 11 tends to become hotter. Even then, by use of the wavelength variation reducing means according to the present invention, it is possible to reduce wavelength variation of the emitted light. Thus, the wavelength variation reducing means according to the present invention is extremely effective in the structure shown in FIG. 17, and this combination provides an extremely great effect of reducing wavelength variation. Even in a case where the light source 11 is composed of light source groups of which each is built into a single package, adopting the heat rejection construction adopted in Embodiment 4, described later, makes it possible to transmit the heat generated by the light source 11 efficiently to the casing 10 or to outside it so as to be rejected therefrom.

Embodiment 3

Still another embodiment of the present invention will be described below with reference to the accompanying drawings. Such components, structures, etc. of Embodiment 3 as are found also in Embodiment 1 or 2 will be identified with common reference numerals and symbols, and no explanations thereof will be repeated.

Figure 18:
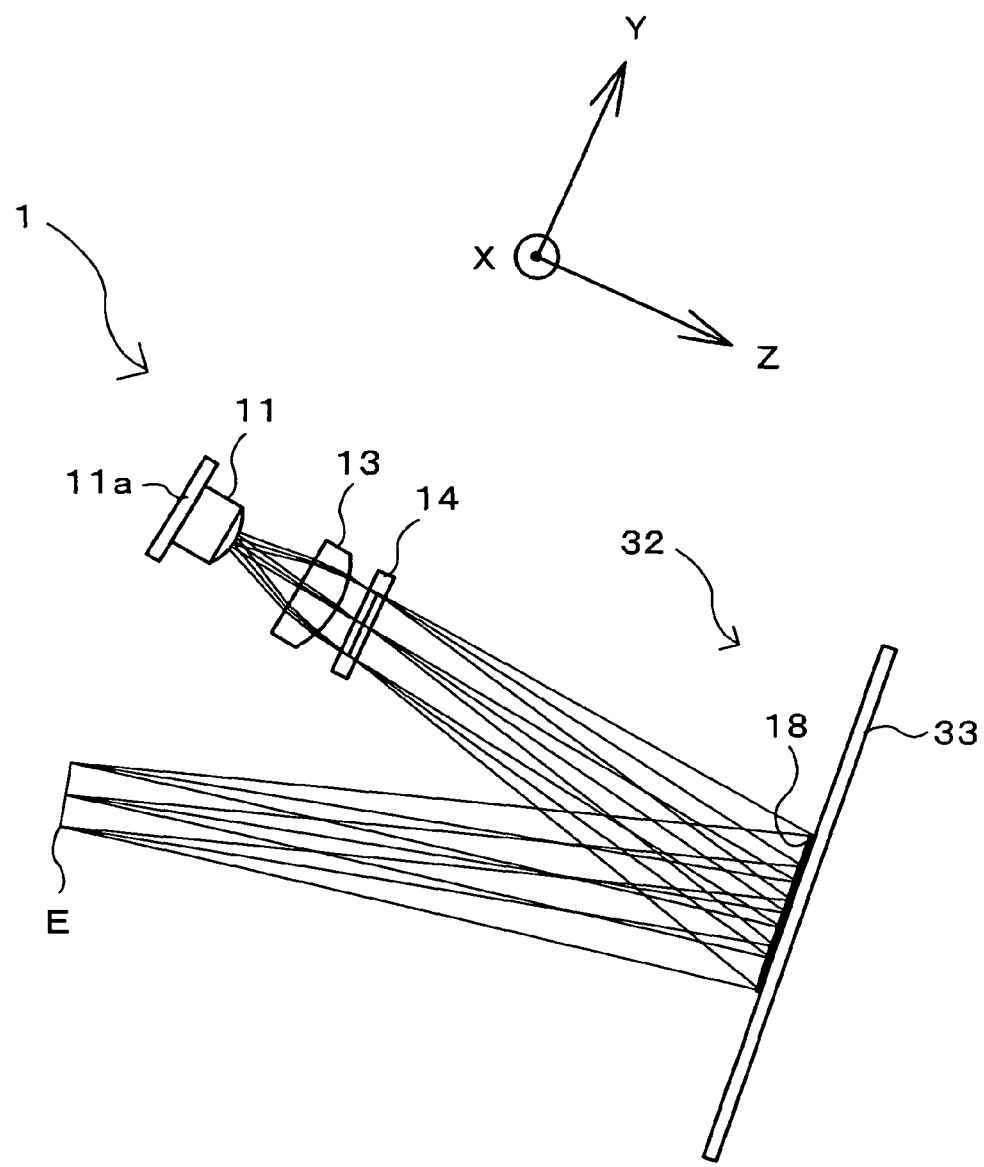
FIG. 18 is a cross-sectional view showing an outline of the construction of an image display apparatus as still another embodiment of the present invention.
Figure 19:
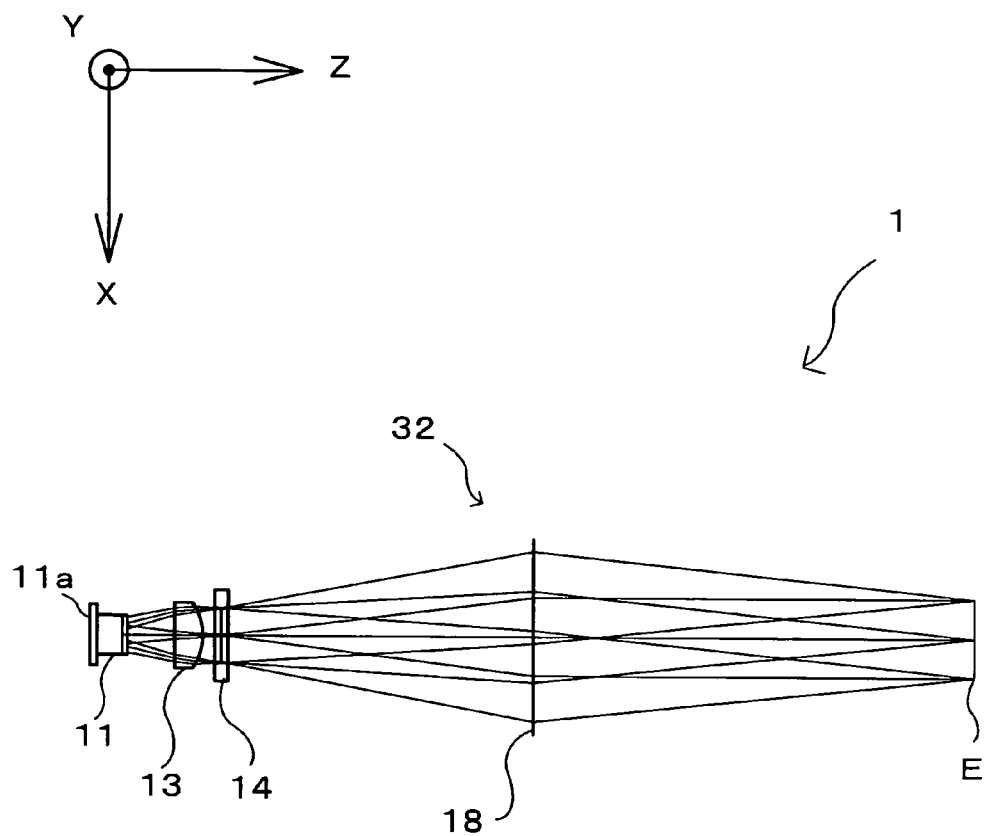
FIG. 19 is a diagram illustrating the optical paths in the above image display apparatus, as optically unfolded in one direction.

FIG. 18 is a cross-sectional view showing an outline of the construction of the image display apparatus 1 of this embodiment, and FIG. 19 is a diagram illustrating the optical paths in the image display apparatus 1, as optically unfolded in one direction. The image display apparatus 1 of this embodiment is constructed similarly to those of Embodiments 1 and 2, the chief differences here being that the eyepiece optical system 15 is replaced with an eyepiece optical system 32 and that the one-way diffuser plate 12 is omitted. Accordingly, the image display apparatus 1 of this embodiment is naturally provided with the wavelength variation reducing means described previously in connection with Embodiment 1.

The eyepiece optical system 32 is built by bonding the hologram optical element 18 onto a transparent substrate 33. In this embodiment, the light source 11 has LEDs of three colors, namely R, G, and B, built into a single package, and is provided with a one-way diffuser plate that mixes together the different colors of the emitted light.

The light emitted from the light source 11 is condensed, in the Y direction, by the condenser lens 13, and then illuminates the display element 14 so as to be modulated thereby. The image light from the display element 14 is diffracted by the hologram optical element 18 of the eyepiece optical system 32 so as to be directed to the optical pupil E. Here, since the light source 11 and the optical pupil E are so located as to be conjugate with each other, the optical pupil E is so sized that x=10 mm and y=2.5 mm as the result of the light-emitting portion (for example so sized that x=3 mm and y=0.5 mm) of the light source 11 being enlarged by a factor of three, which is the image magnification factor of the optical system, and then slightly further enlarged by being diffused at about 1° by the display element 14.

As described above, in this embodiment, in one direction (in the X direction), the optical pupil E is sized 10 mm, and is thus larger than the human pupil (about 3 mm). This allows the observer easy observation of the presented image. On the other hand, in the other direction (in the Y direction), the optical pupil E is about as large as the human pupil, and in addition light is condensed in the Y direction. This makes it possible to present the observer with a bright image without an undue loss.

Figure 20:
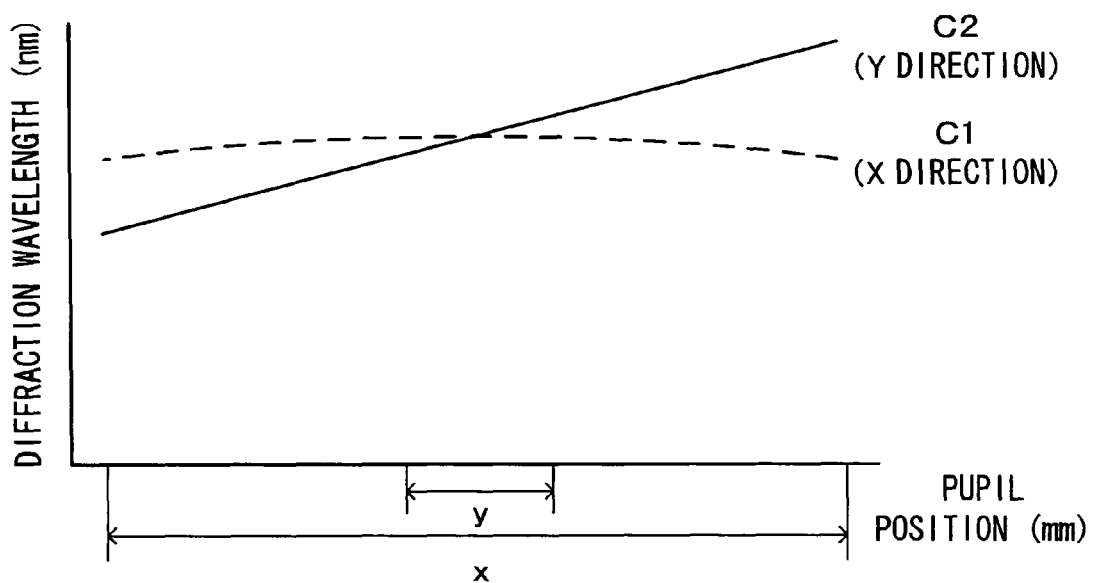
FIG. 20 is a diagram illustrating the relationship between the pupil position in the optical pupil and a principal diffraction wavelength.

FIG. 20 is a diagram illustrating the relationship between the pupil position in the optical pupil E and the principal diffraction wavelength (for example, that of R light). In the figure, broken line D1 represents variation in the diffraction wavelength in the X direction of the optical pupil E, and solid line D2 represents variation in the diffraction wavelength in the Y direction of the optical pupil E. As this figure shows, the diffraction wavelength varies less in the X direction, which is perpendicular to the plane of incidence of the optical axis, than in the Y direction, which is parallel to the plane of incidence of the optical axis.

Thus, by forming the optical pupil E smaller in the Y direction, in which the diffraction wavelength varies more (the angle of incidence varies more), it is possible to narrow the range over which the diffraction wavelength varies, and thereby to present an image with high color purity.

The light source 11 incorporates a lens, and is given an angle of radiation as small as, for example, 90 degrees. This helps reduce useless light that does not contribute to forming the optical pupil E (thereby leading to high light use efficiency), and thus shares a role in presenting the observer with a bright image.

Needless to say, in the construction of this embodiment, the one-way diffuser plate 12 used in Embodiment 1 or 2 may be used. In that case, the one-way diffuser plate 12 is used to diffuse light in the X direction, in which wavelength selectivity is not high. This helps further widen the optical pupil E in the X direction while maintaining high color purity.

The diffuser plate may be used to diffuse light also in the Y direction. This helps widen the optical pupil E in the Y direction. In this case, since color unevenness worsens as the optical pupil E becomes larger in the Y direction, it is preferable that the optical pupil E be sized about 7 mm at most in the Y direction.

In this embodiment, as in Embodiments 1 and 2, the hologram optical element 18 is so fabricated as to diffract the image light in wavelength bands of 465±5 nm, 521±5 nm, and 634±5 nm as represented in terms of their respective peak-diffraction-efficiency wavelengths and diffraction-efficiency half-peak wavelength widths. In this embodiment, where the hologram optical element 18 is bonded onto the transparent substrate 33 to build the eyepiece optical system 32, the image light from the display element 14 is directly incident on the hologram optical element 18. This permits the light to be incident on the interference fringes recorded on the hologram optical element 18 at a smaller angle of incidence than in Embodiment 1.

More specifically, whereas in the construction of Embodiment 1 the angle of incidence of the light incident on the hologram optical element 18 is, for example, 25° to 35° in the medium, in the construction of this embodiment the angle of incidence is reduced to, for example, 10° to 15°. Thus, a variation in angle of incidence affects wavelength selectivity less and thus produces less color unevenness than in Embodiment 1. That is, as will be clear from a comparison between FIGS. 20 and 13, since the angle of incidence is smaller in this embodiment than in Embodiment 1, diffraction wavelength varies less, both in the X and Y directions, than in Embodiment 1. Thus, it is possible to obtain a larger optical pupil E than in Embodiment 1, and to present an image with high color purity and with a wide color reproduction region.

Moreover, the use of the wavelength variation reducing means described previously in connection with Embodiment 1 reduces wavelength variation of the emitted light attributable to the duration of use and the ambient temperature of use. Thus, it is possible to present a bright image with high color purity irrespective of the duration of use or the ambient temperature of use.

Embodiment 4

A further embodiment of the present invention will be described below with reference to the accompanying drawings. Such components, structures, etc. of Embodiment 4 as are found also in Embodiment 1, 2, or 3 will be identified with common reference numerals and symbols, and no explanations thereof will be repeated.

Figure 21:
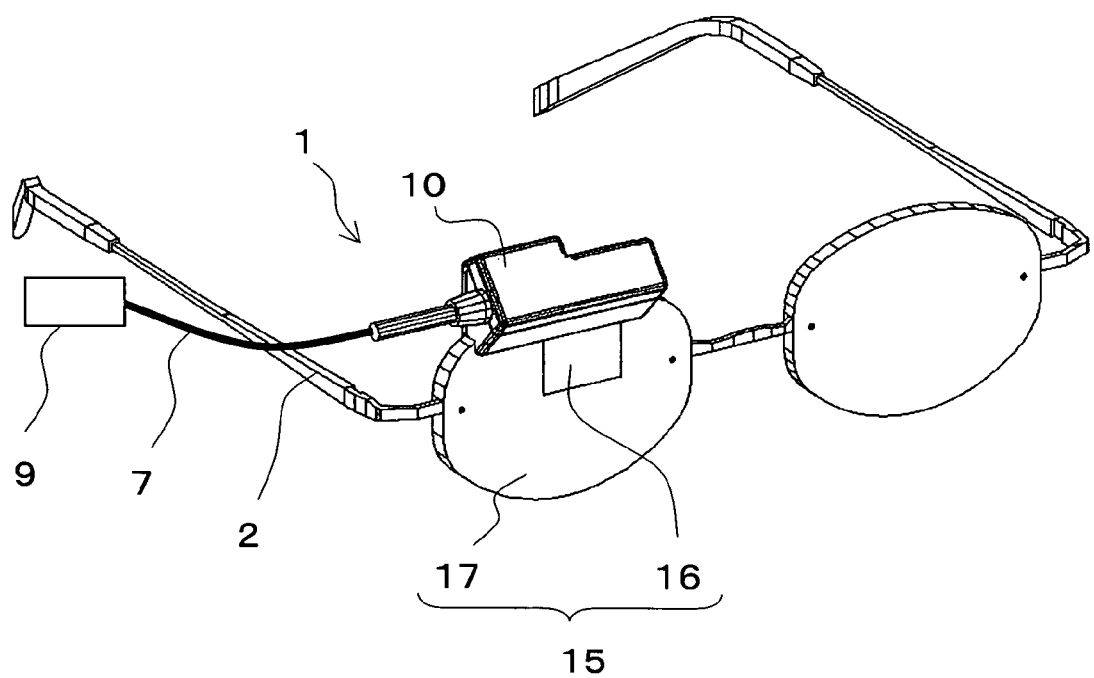
FIG. 21 is a perspective view showing an outline of the construction of an HMD as a further embodiment of the present invention.

FIG. 21 is a perspective view showing an outline of the construction of the HMD of this embodiment. The HMD includes an image display apparatus 1 and supporting means 2 (a supporting member).

Figure 22:
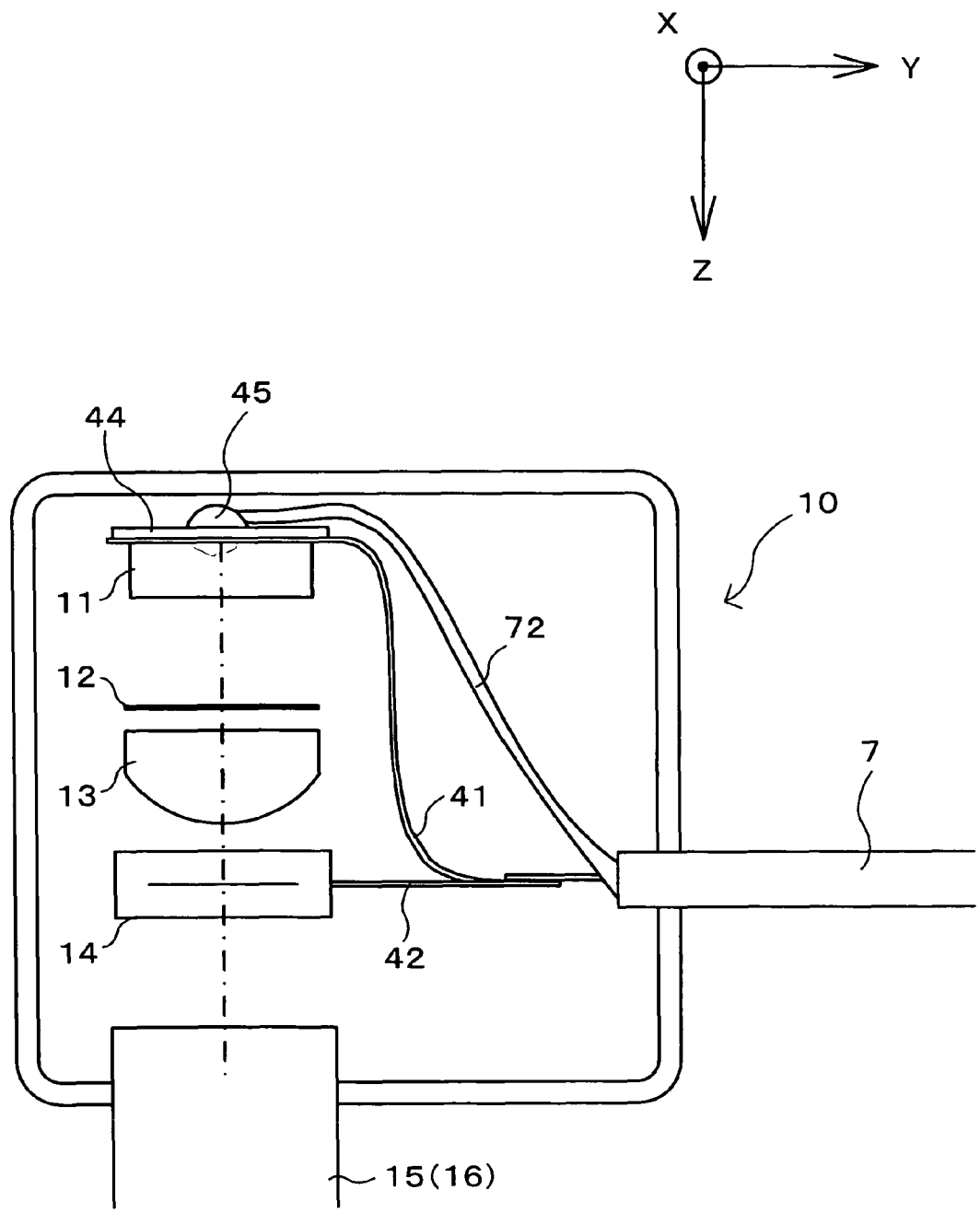
FIG. 22 is a diagram schematically illustrating the construction inside the casing of the image display apparatus provided in the above HMD.

The image display apparatus 1 has a casing 10 that houses at least a light source 11 and a display element 14 (for both, see FIG. 22). The casing 10 here holds part of the eyepiece optical system 15. As a whole the eyepiece optical system 15 has a shape like one (in FIG. 2, the one for the right eye) of the lenses of spectacles. The supporting means 2 corresponds to the frame of spectacles, and supports the image display apparatus 1 (in particular, the eyepiece optical system 15) in front of an observer's eye. The image display apparatus 1 further includes a circuit board 9 from which at least driving electric power and image signals are supplied to the light source 11 and the display element 14 across a cable 7 laid through the casing 10.

The basic construction of the image display apparatus 1 is largely the same as in Embodiment 1 shown in FIG. 1. The chief difference from Embodiment 1 lies in the construction (inside the casing 10) adopted for heat rejection from the light source 11. The heat rejection construction adopted in this embodiment will be described later.

When an observer wears the HMD on his head, and an image is displayed on the display element 14, the image light is directed through the eyepiece optical system 15 to the observer's eye. This allows the observer to observe a virtual image of the image on the image display apparatus 1. Simultaneously, the observer can observe an outside image through the eyepiece optical system 15 in a see-through fashion.

In this embodiment, the light source 11 that illuminates the display element 14 is composed of two light source groups 11P and 11Q. The optical paths of the light emitted from the light source groups 11P and 11Q are the same as in the construction shown in FIG. 14. Here, the arrangement of the light-emitting portions of the light source 11 in Embodiment 2 shown in FIG. 15 can be applied unchanged.

Figure 23:
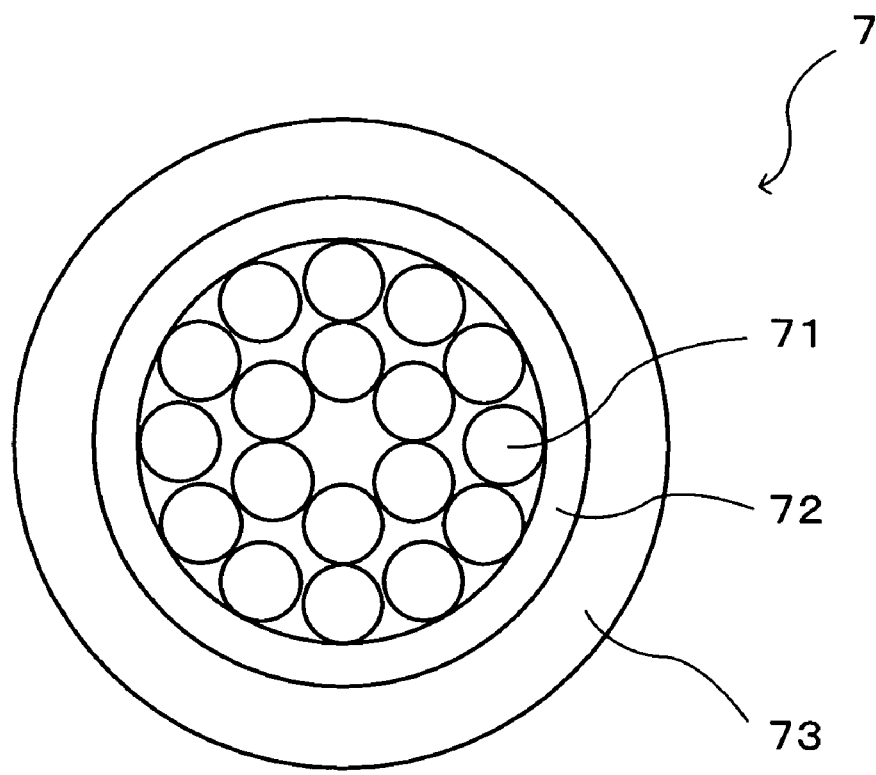
FIG. 23 is a cross-sectional view of the cable provided in the above image display apparatus.

Next, the detailed construction inside the casing 10 will be described. FIG. 22 is a diagram schematically illustrating the construction inside the casing 10 of the image display apparatus 1 in this embodiment. FIG. 23 is a cross-sectional view of the cable 7.

The light source 11 is electrically connected via a flexible printed circuit (hereinafter also referred to as "FPC") 41 to signal conductors 71 of the cable 7, and the display element 14 is connected via an FPC 42 to other signal conductors 71. Here, the cable 7 has a plurality of signal conductors 71 bundled inside a shield conductor 72, and has all these covered from around with a cover 73 formed of an insulating material. Thus structured, the cable 7 permits, across the signal conductors 71 thereof, the light source 11 and the display element 14 to be supplied with driving electric power and image signals from the circuit board 9 (see FIG. 21).

It is assumed that the signal conductors 71 are each coated with insulating tape wound around it so as to be insulated from one another. The shield conductor 72 is for shielding electromagnetic emissions. In this embodiment, the shield conductor 72 is formed of a metal material having a thermal conductivity of 100 $Wm^{-1}K^{-1}$ or more. Examples of such metal materials include, to name a few, silver (about 420 $Wm^{-1}K^{-1}$), copper (about 400 $Wm^{-1}K^{-1}$), aluminum (about 250 $Wm^{-1}K^{-1}$), and brass (about 120 $Wm^{-1}K^{-1}$).

Figure 24:
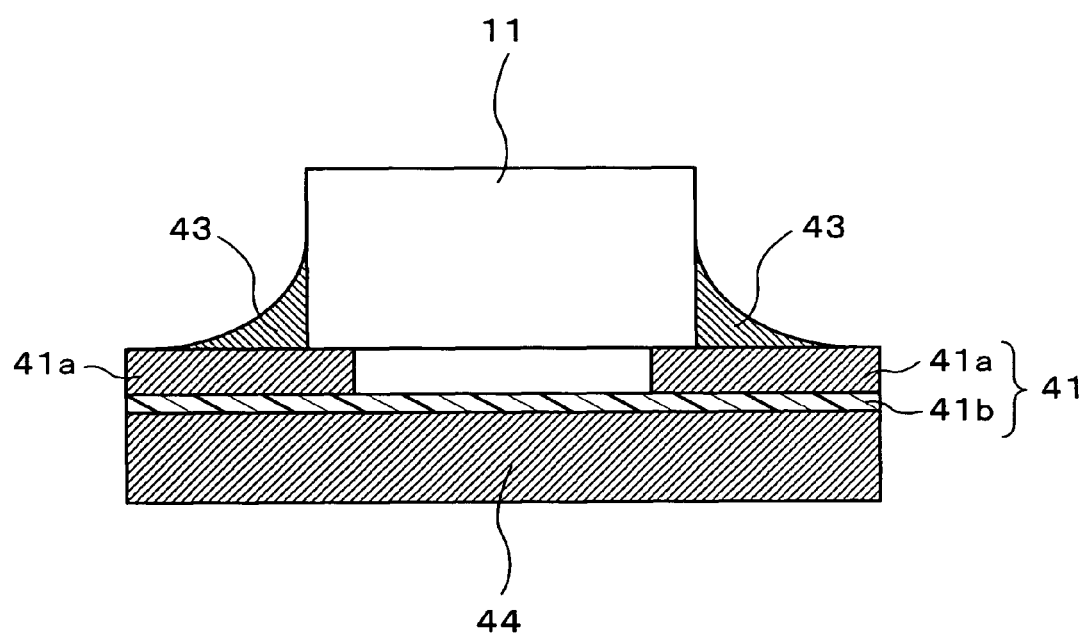
FIG. 24 is a cross-sectional view schematically showing the connecting portion between the light source of the above image display apparatus and a flexible printed circuit.

FIG. 24 is a cross-sectional view schematically showing the connecting portion between the light source 11 and the FPC 41. As shown in the figure, the FPC 41 has land portions 41a formed on an insulating layer 41b. Here, the land portions 41a are formed of rolled copper foil, and the insulating layer 41b is formed of, for example, polyimide. The land portions 41a are, for example, 12.5 mm thick, and the insulating layer 41b is, for example, 12.5 μm thick. The land portions 41a may be formed of any metal material so long as it has a thermal conductivity of 100 $Wm^{-1}K^{-1}$ or more. The light source 11 is bonded (soldered) to and thereby mounted on the land portions 41a of the FPC 41 with solder 43.

On the other hand, on the back face of the FPC 41, that is, on the face of the FPC 41 opposite from the face thereof on which the light source 11 is mounted, a heat absorbing member 44 is arranged by being bonded thereto. The heat absorbing member 44 serves to absorb heat from the light source 11, and is so arranged as to completely cover the part of the FPC 41 (insulating layer 41b) opposite from the land portions 41a. That is, the heat absorbing member 44 is arranged opposite the land portions 41a so as to completely cover the land portions 41a. Moreover, the heat absorbing member 44 is formed of a metal plate of a metal material having a thermal conductivity of 100 $Wm^{-1}K^{-1}$ or more, and is bonded (soldered) to the shield conductor 72 of the cable 7 with solder 45.

With this structure, the heat generated by the light source 11 travels via the solder 43 to the land portions 41a. The heat then travels from the land portions 41a via the insulating layer 41b to the heat absorbing member 44, and then travels via the solder 45 and the shield conductor 72 to outside the casing 10, so that the heat is thereby expelled.

Here, the land portions 41a have a certain area relative to the insulating layer 41b of the FPC 41, and the heat absorbing member 44 too has a certain area relative to the FPC 41; thus, the heat generated by the light source 11 is efficiently rejected through the surface of the land portions 41a, and the rejected heat is efficiently absorbed, via the insulating layer 41b, through the surface of the heat absorbing member 44. Thus, with the construction of this embodiment, it is possible to lead the heat generated by the light source 11 out of the casing 10 efficiently to reject it, and thereby to avoid undesirable conditions resulting from the heat generated by the light source 11, such as a drop in image brightness and deterioration of components. The insulating layer 41b of the FPC 41 is, for example, as thin as 12.5 μm, and therefore it does not cause a serious hindrance to the conduction of heat from the land portions 41a to the heat absorbing member 44.

Moreover, since the heat absorbing member 44 is so arranged as to completely cover the part of the FPC 41 opposite from a plurality of land portions 41a, it efficiently absorbs the heat generated from the light source 11 via the land portions 41a, across the minimum distance corresponding to the thickness of the FPC 41. This permits the heat that has traveled from the light source 11 to the land portions 41a to be efficiently led to the heat absorbing member 44 so as to be absorbed thereby.

Furthermore, even in a case where, as in this embodiment, the light source 11 is composed of a plurality of light source groups 11P and 11Q, the heat generated by each LED provided in the light source groups 11P and 11Q can be led, via the land portions 41 corresponding to that LED, to the heat absorbing member 44 across the minimum distance. Thus, heat rejection from the different LEDs progresses evenly, and this helps avoid producing variations in the light emission performance of the LEDs among the light source groups 11P and 11Q.

Moreover, since the heat absorbing member 44 is formed of a metal plate of a metal material having a thermal conductivity of 100 $Wm^{-1}K^{-1}$ or more, it achieves high heat absorption efficiency. Moreover, since the heat absorbing member 44 is formed of a metal plate, it can be easily worked on and bonded to the FPC 41.

Moreover, in this embodiment, the shield conductor 72 of the cable 7 is used as a heat conducting member for leading the heat absorbed by the heat absorbing member 44 out of the casing 10. This makes it possible to achieve heat rejection from the light source 11 by making good use of the shield conductor 72, which is provided in the cable 7 from the beginning. Moreover, by use of the shield conductor 72, it is possible to lead the heat absorbed by the heat absorbing member 44 from inside to outside the casing 10 easily and surely.

Moreover, since the shield conductor 72 serving as a heat conducting member is formed of a metal material having a thermal conductivity of 100 $Wm^{-1}K^{-1}$ or more, it is possible to lead the heat absorbed by the heat absorbing member 44 via the shield conductor 72 out of the casing 10 efficiently.

Figure 25:
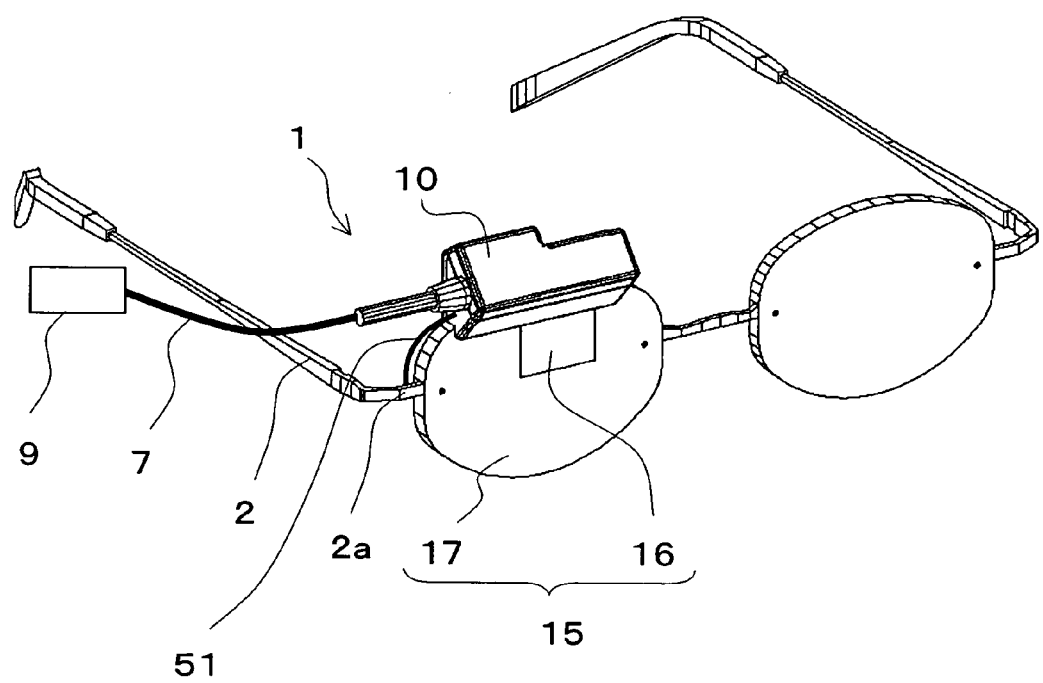
FIG. 25 is a perspective view showing another example of the construction of the above HMD.
Figure 26:
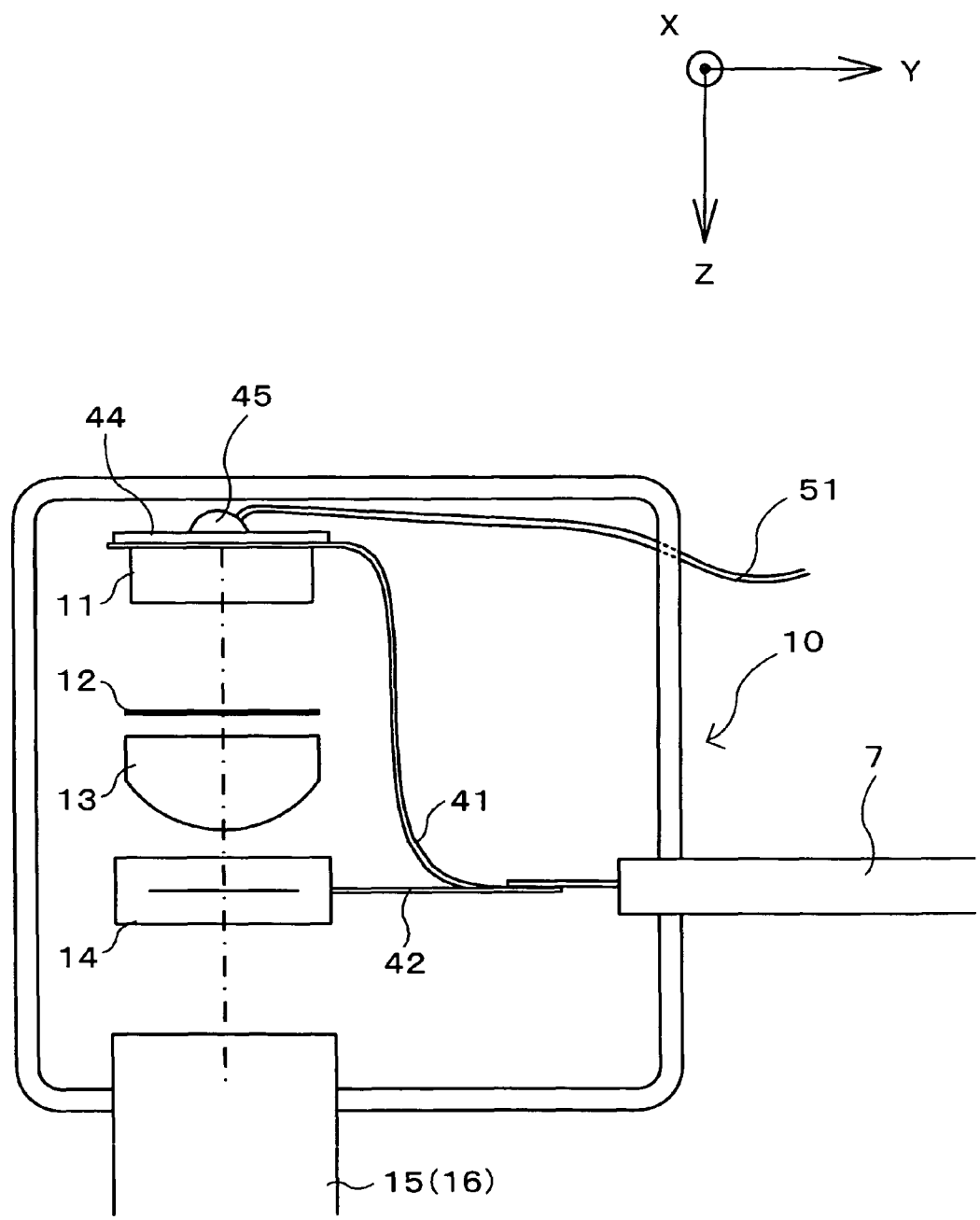
FIG. 26 is a diagram illustrating the detailed construction inside the casing of the above HMD.

FIG. 25 is a perspective view showing another example of the construction of the HMD. In this HMD, the supporting means 2 has a supporting-side metal portion 2a. The supporting-side metal portion 2a is formed of a metal material having a thermal conductivity of 100 $Wm^{-1}K^{-1}$ or more, and forms at least part of the supporting means 2; that is, the entire supporting means 2 may be formed by the supporting-side metal portion 2a. On the other hand, the heat absorbing member 44 (see FIG. 26) has a heat conducting member 51 connected thereto with solder 45, and the heat conducting member 51 is laid through the casing 10 and is coupled to the supporting-side metal portion 2a of the supporting means 2. The heat conducting member 51 is formed of a metal material having a thermal conductivity of 100 $Wm^{-1}K^{-1}$ or more.

With this construction, the heat generated by the light source 11 is absorbed by the heat absorbing member 44 via the solder 43 and the FPC 41 (the land portions 41a and the insulating layer 41b) shown in FIG. 24, and is then led via the solder 45 and the heat conducting member 51 to the supporting-side metal portion 2a outside the casing 10, so as to be rejected therefrom. Thus, with this construction too, heat rejection from the light source 11 can be achieved outside the casing 10.

In particular, since the heat conducting member 51 is formed of a metal material having a thermal conductivity of 100 $Wm^{-1}K^{-1}$ or more, the heat absorbed by the heat absorbing member 44 can travel to the heat conducting member 51 easily. Moreover, since the supporting-side metal portion 2a too is formed of a metal material having a thermal conductivity of 100 $Wm^{-1}K^{-1}$ or more, the heat from the heat conducting member 51 can travel to the supporting-side metal portion 2a easily. Thus, it is possible to surely lead the heat generated by the light source 11 via the heat conducting member 51 to the supporting-side metal portion 2a, and to surely reject the heat therefrom.

Figure 27:
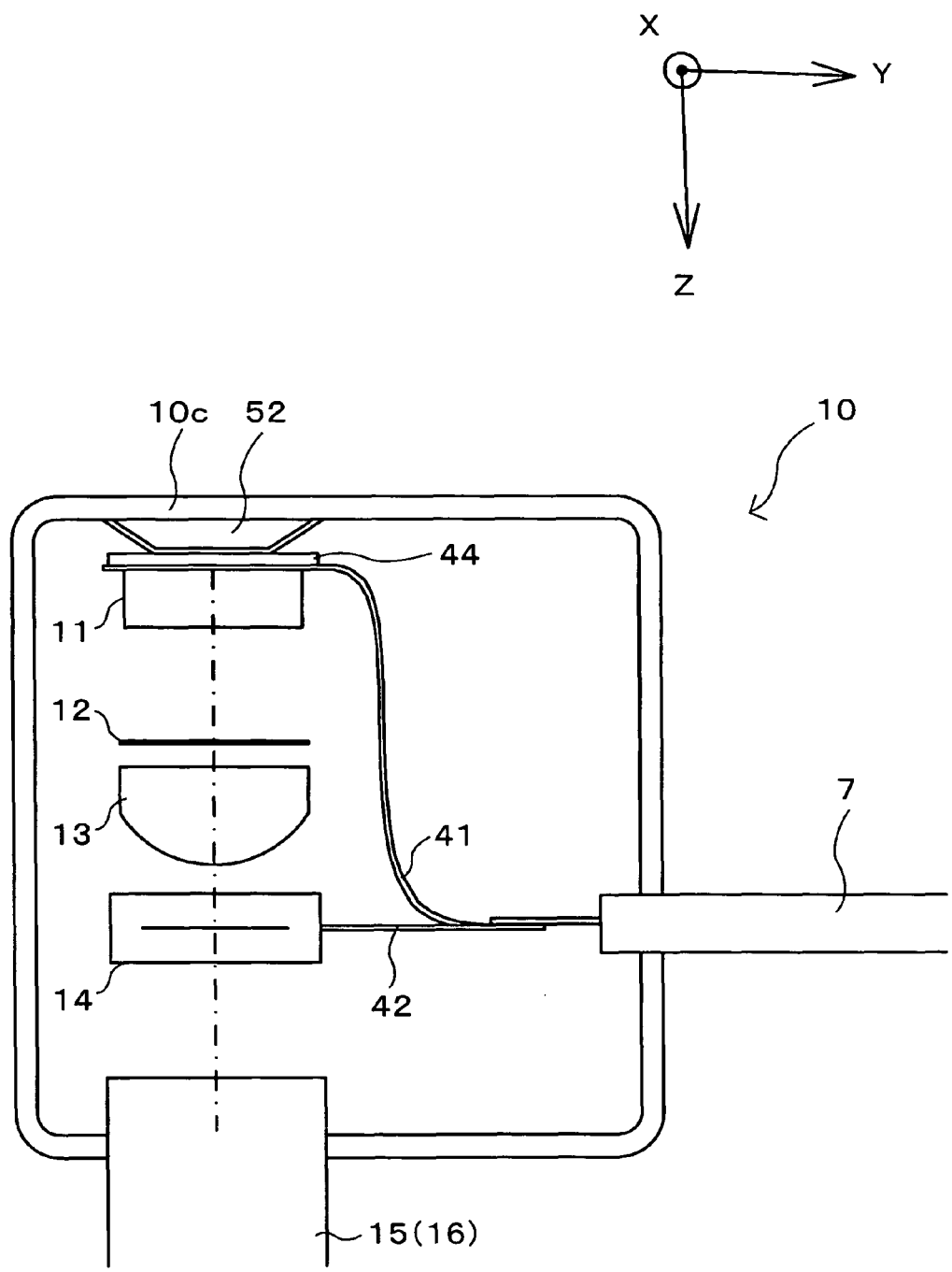
FIG. 27 is a diagram illustrating another example of the construction inside the casing of the above HMD.

FIG. 27 is a diagram illustrating another example of the construction inside the casing 10 of the HMD. In this construction, the casing 10 has a casing-side metal portion 10c that is exposed to outside. The casing-side metal portion 10c is formed of a metal material having a thermal conductivity of 100 $Wm^{-1}K^{-1}$ or more, and forms at least part of the casing 10; that is, the entire casing 10 may be formed by the casing-side metal portion 10c. On the other hand, the heat absorbing member 44 is coupled via a heat conducting member 52 to the casing-side metal portion 10c. The heat conducting member 52 is formed of a metal material having a thermal conductivity of 100 $Wm^{-1}K^{-1}$ or more.

With this construction, the heat generated by the light source 11 is absorbed, via the FPC 41 (the land portions 41a and the insulating layer 41b), by the heat absorbing member 44, and is then led via the heat conducting member 52 to the casing-side metal portion 10c. With this construction, since the casing-side metal portion 10c is exposed to outside, the heat led to the casing-side metal portion 10c can be rejected therefrom to outside.

In particular, since the heat conducting member 52 is formed of a metal material having a thermal conductivity of 100 $Wm^{-1}K^{-1}$ or more, the heat absorbed by the heat absorbing member 44 can travel to the heat conducting member 52 easily. Moreover, since the casing-side metal portion 10c too is formed of a metal material having a thermal conductivity of 100 $Wm^{-1}K^{-1}$ or more, the heat from the heat conducting member 52 travels to the casing-side metal portion 10c easily. Thus, it is possible to surely lead the heat generated by the light source 11 via the heat conducting member 52 to the casing-side metal portion 10c, and to surely reject the heat therefrom.

The land portions 41a, the heat absorbing member 44, and the heat conducting members (the shield conductor 72 and the heat conducting members 51 and 52) may be formed of the same material, or may be formed of different materials. As necessary, the heat absorbing member 44 and the heat conducting member 51 (or 52) may be formed integrally.

For effective heat dissipation, it is preferable that, as in this embodiment, the light source 11 (LEDs) be mounted on the land portions 41a of the FPC 41 by being soldered thereto. This, however, is not meant to limit in any way how the LEDs are mounted; the LEDs may bonded, for example, with adhesive (which may be electrically conductive), or in any other way.

In this embodiment, an FPC 41 is used as the circuit board on which the LEDs are mounted. Depending on the arrangement of the LEDs, however, the circuit board does not necessarily have to be a flexible circuit board. Even then, it is preferable that the circuit board have a sufficiently thin insulating layer as described in connection with this embodiment.

Needless to say, in realizing an image display apparatus 1, and hence an HMD, it is possible to combine together different aspects of the construction for heat rejection from the light source 11 described in connection with this embodiment, such as by connecting the heat absorbing member 44 not only to the shield conductor 72 but also to the heat conducting member 51 or 52 or both.

The embodiments described above all deal with variously constructed image display apparatuses 1 suitable for use in HMDs. It should be understood, however, that the image display apparatuses 1 of these embodiments can be applied also to other types of apparatuses, for example head-up displays.

Needless to say, in realizing an image display apparatus 1 or an HMD, different aspects of the constructions of the different embodiments and examples described above may be combined together appropriately.

The present invention can alternatively be expressed as follows:

According to the present invention, an image display apparatus—provided with: a light source that emits light; a display element that displays an image by modulating the light emitted from the light source; and an eyepiece optical system that directs the image light from the display element to an observer's eye—may be constructed as follows: the light emitted from the light source has intensity peaks at predetermined wavelengths corresponding to three primary colors (RGB); the display element has color filters corresponding to the three primary colors; the eyepiece optical system has a volume-phase-type reflective hologram optical element that diffracts the light exiting from the display element; the hologram optical element has diffraction-efficiency peaks at wavelengths corresponding to the peak-intensity wavelengths of the light emitted from the light source; and the image display apparatus has wavelength variation reducing means for reducing wavelength variation of the light emitted from the light source.

With the above construction, the light of the wavelengths corresponding to the three primary colors emitted from the light source is modulated by the display element. Then, the light of the three primary colors is allowed, by the color filters of the display element, restricted transmission therethrough according to its wavelengths, so that the light transmitted therethrough is permitted to exit as the image light. For example, the R color filters transmit, of the light emitted from the light source, only R light and do not transmit light of other wavelengths. The light transmitted through the color filters of the different colors is then diffracted by the volume-phase-type reflective hologram optical element (hereinafter also referred to simply as "hologram optical element") and is thereby directed to the observer's eye.

The hologram optical element has diffraction-efficiency peaks at wavelengths corresponding to the peak-intensity wavelengths of the light emitted from the light source. Thus, with this construction according to the present invention, where the light emitted from the light source has intensity-peaks in all of the R, G, and B wavelength bands, the hologram optical element likewise has diffraction-intensity peaks in all of the R, G, and B wavelength bands.

The display element has color filters corresponding to the three primary colors, and thus has low light transmissivity. To present a bright image, therefore, it is necessary to use a high-brightness light source, that is, a light source that emits light with high light intensity. A high-brightness light source, however, accumulates heat and thereby causes the wavelengths of the emitted light to vary. As the wavelengths of the emitted light vary, the wavelengths of the intensity peaks of the emitted light deviate from those of the diffraction-efficiency peaks of the hologram optical element. This dims the image obtained through the hologram optical element.

In the present invention, however, variation of the wavelengths of the light emitted from the light source is reduced by the wavelength variation reducing means. Thus, it is possible to reduce deviation, resulting from heat accumulation in the light source, of the wavelengths of the intensity peaks of the emitted light from those of the diffraction-efficiency peaks of the hologram optical element. In this way, even in a construction employing a high-brightness light source, a display element having color filters, and a volume-phase-type reflective hologram optical element, it is possible to diffract the light emitted from the light source with the hologram optical element efficiently, and thereby to present a bright image. In addition, since wavelength variation of the light emitted from the light source is reduced, it is possible to present an image with high color purity and with high-grade color reproduction.

In the present invention, let any of the peak-intensity wavelengths of the light emitted from the light source be $\lambda L$ nm, and let the corresponding one of the peak-diffraction-efficiency wavelengths of the hologram optical element be $\lambda H$ (nm), then it is preferable that the wavelength variation reducing means reduce wavelength variation of the light emitted from the light source such that $\lambda H - 10$ nm $\leq \lambda L \leq \lambda H + 10$ nm.

In that case, wavelength variation of the light emitted from the light source is within ±10 nm of the peak-diffraction-efficiency wavelengths of the hologram optical element. This makes it possible to obtain high-grade color reproduction, and to present a bright image efficiently by use of a light source that has narrow intensity half-peak wavelength widths, for example as narrow as about 20 nm.

In the construction described above, it is preferable that the diffraction-efficiency half-peak wavelength widths of the hologram optical element be 20 nm or less. In that case, with the diffraction-efficiency half-peak wavelength widths as narrow as 20 nm or less, it is possible to present an image with high color purity, and in addition the hologram optical element transmits outside light with high transmissivity. Thus, in a case where a hologram optical element is used as a combiner that directs the image light from a display element and outside light simultaneously to an observer's eye, the observer can, while observing a presented image with high color purity, observe a bright outside image.

In the present invention, let any of the peak-intensity wavelengths of the light emitted from the light source be $\lambda L$ nm, and let the corresponding one of the peak-diffraction-efficiency wavelengths of the hologram optical element be $\lambda H$ nm, then it is further preferable that the wavelength variation reducing means reduce wavelength variation of the light emitted from the light source such that $\lambda H - 5$ nm $\leq \lambda L \leq \lambda H + 5$ nm.

In that case, wavelength variation of the light emitted from the light source is within ±5 nm of the peak-diffraction-efficiency wavelengths of the hologram optical element. This results in extremely high-grade color reproduction. Moreover, it is possible to present a bright image extremely efficiently by use of a hologram optical element having diffraction-efficiency half-peak wavelength widths of about 10 nm.

In the construction described above, it is preferable that the diffraction-efficiency half-peak wavelength widths of the hologram optical element be 10 nm or less. In that case, with considerably narrow diffraction-efficiency half-peak wavelength widths of 10 nm or less, it is possible to present an image with extremely high color purity, and the hologram optical element transmits outside light with extremely high transmissivity. Thus, in a case where a hologram optical element is used as a combiner that directs the image light from a display element and outside light simultaneously to an observer's eye, the observer can, while observing a presented image with extremely high color purity, observe an extremely bright outside image.

In the present invention, it is preferable that the light source be realized with an LED. LEDs are inexpensive and compact, and offer high color purity because of their narrow light emission wavelength widths. Accordingly, building the light source with an LED helps achieve an inexpensive, compact construction that presents a bright image efficiently with high color purity.

In the present invention, it is preferable that the wavelength variation reducing means reduce wavelength variation of the R light emitted from the LED. Generally, the intensity half-peak wavelength of the R light emitted from an LED is as narrow as about 20 nm. On the other hand, a volume-phase-type reflective hologram optical element exhibits increasingly high wavelength selectivity to increasingly long wavelengths, more tending to make the diffracted light (image light) dim in response to a variation in wavelength. Thus, by reducing, with the wavelength variation reducing means, wavelength variation of the R light emitted from the LED, it is possible to increase the use efficiency of R light, which has a long wavelength, and thereby to present a bright image.

In the present invention, the wavelength variation reducing means may be realized as transmitting means for transmitting the heat accumulated in the light source to outside. The transmitting means may be, for example, a holding portion that holds the light source, a casing that is provided with such a holding portion, a heat-sink plate bonded to the circuit board of the light source, or a casing to which the circuit board of the light source is directly bonded, or a combination of two or more of these. When the wavelength variation reducing means is realized as transmitting means in this way, the transmitting means surely leads the heat accumulated in the light source to outside (for example, into the atmosphere). Thus, it is possible to surely reduce wavelength variation of the emitted light resulting from heat accumulation in the light source. Moreover, when the transmitting means has a thermal conductivity of 100 $Wm^{-1}K^{-1}$ or more, the heat accumulated in the light source can be effectively dissipated (rejected) to outside.

In the present invention, the light source may have a plurality of light-emitting chips that respectively emit light having intensity peaks at predetermined wavelengths, and the wavelength variation reducing means may be realized as controlling means for controlling light emission from the light-emitting chips, the controlling means passing electric currents through the light-emitting chips in such a way that light emission periods during which the light-emitting chips are all supplied with electric currents so that they emit light simultaneously alternate with heat rejection periods during which none of the light-emitting chips is supplied with an electric current so that heat is rejected, and that the light emission periods are longer than the heat rejection periods.

With this construction, the controlling means serving as the wavelength variation reducing means controls light emission from the light-emitting chips in such a way that light emission periods alternate with heat rejection periods, with the result that, even though the light-emitting chips emit light simultaneously during the light emission periods, the heat accumulated in the light source is surely rejected during the heat rejection periods. This makes it possible to surely reduce wavelength variation of the emitted light resulting from heat accumulation in the light source. Moreover, making the light emission periods longer than the heat rejection periods helps present the observer with a bright image.

In the present invention, the light source may have light-emitting chips that respectively emit light having intensity peaks at predetermined wavelengths corresponding to R, G, and B, and the wavelength variation reducing means may be realized as controlling means for controlling light emission from the light-emitting chips, the controlling means passing electric currents through the light-emitting chips in such a way that periods during which the R, G, and B light-emitting chips respectively emit light are shifted from one another so that at least one of them does not emit light at any time.

With this construction, under the control of the controlling means serving as the wavelength variation reducing means, the R, G, and B light-emitting chips emit light during periods that are shifted from one another so that at least one of them does not emit light at any time. Thus, there exists no period during which the three, namely R, G, and B, light-emitting chips all emit light simultaneously. This helps reduce the heat itself accumulated in the light source, and, even the heat accumulated in the light source is rejected while, for example, only one of the R, G, and B light-emitting chips is emitting light. Thus, it is possible to surely reduce wavelength variation of the emitted light resulting from heat accumulation in the light source.

In the present invention, the light source may have a plurality of light-emitting chips that respectively emit light having intensity peaks at predetermined wavelengths, and the wavelength variation reducing means may be realized as controlling means for controlling light emission from the light-emitting chips, the controlling means passing electric currents through the light-emitting chips in such a way that the light-emitting chips emit light one after another so that periods during which they respectively emit light do not overlap with one another, and that, after any of the light-emitting chips emits light, that light-emitting chip is supplied with no electric current for a period required for heat rejection therefrom.

With this configuration, under the control of the controlling means serving as the wavelength variation reducing means, the plurality of light-emitting chips respectively emit light during periods that do not overlap with one another. Thus, no two or more of the light-emitting chips emit light simultaneously. Moreover, after any of the light-emitting chips emits light, that light-emitting chip is not supplied with an electric current for a period required for heat rejection therefrom. Hence, for whichever light-emitting chip has just emitted light, heat is surely rejected therefrom. Thus, it is possible to surely reduce wavelength variation of the emitted light resulting from heat accumulation in the light source.

Moreover, since no two or more of the light-emitting chips emit light simultaneously, the electric current passed through each of them can be increased up to the rated maximum electric current. In addition, since the supply of electric currents to the light-emitting chips is stopped only for the minimum period required for heat rejection therefrom, they can be kept emitting light for as long periods as possible. This makes it possible to present a bright image.

In the present invention, it is preferable that the hologram optical element have an axis-asymmetric positive optical power. Using such a hologram optical element helps increase flexibility in the arrangement of the optical components provided in the apparatus, making it easy to build the apparatus compact.

In the present invention, it is preferable that the optical pupil formed by the eyepiece optical system be larger in the direction perpendicular to the plane of incidence along which the optical axis runs onto the hologram optical element than in the direction parallel to the plane of incidence. Here, the plane of incidence along which the optical axis runs onto the hologram optical element denotes the plane including both the optical axis of light incident on the hologram optical element and the optical axis of light reflected therefrom.

When the hologram optical element is axis-asymmetric, in the direction parallel to the plane of incidence along which the optical axis runs onto the hologram optical element, the hologram optical element exhibits sharper wavelength characteristics (high wavelength selectivity), and thus a deviation in the angle of incidence of incident light tends to cause a deviation in diffraction wavelength. Thus, by making the optical pupil larger in the direction perpendicular to the plane of incidence, that is, by making it larger in the direction in which wavelength characteristics are gentle, it is possible to present the observer with an image with little color unevenness that is easy to observe. Moreover, since the optical pupil is smaller in the direction parallel to the plane of incidence than in the direction perpendicular thereto, it is possible to efficiently condense the light from the light source, and thereby to present the observer with a bright image.

In the present invention, it is preferable that the light source and the optical pupil be substantially conjugate with each other in the direction parallel to the plane of incidence. In that case, it is possible to enhance the use efficiency of the light of the light source, and it is possible to present an image with high-grade color reproduction and with high color purity.

In the present invention, it is preferable that the light source have (at least one group of) three light-emitting portions that emit light corresponding to three primary colors, and that the light-emitting portions be arranged side by side in the direction perpendicular to the plane of incidence.

As described above, the direction perpendicular to the plane of incidence is the direction in which the hologram optical element exhibits gentle wavelength characteristics. Accordingly, arranging the three light-emitting portions emitting light of different colors side by side in the direction in which the hologram optical element exhibits gentle wavelength characteristics makes it possible to mix colors in the direction in which the optical pupil can be enlarged. Thus, even in a case where a light source having three light-emitting portions is used, it is possible to present the observer with a high-quality image with little color unevenness.

In the present invention, it is preferable that the light source have an even number of groups of three light-emitting portions emitting light corresponding to three primary colors, and that the order in which the light-emitting portions are arranged within each group in the direction perpendicular to the plane of incidence along which the optical axis runs into the hologram optical element be reversed between adjacent groups.

In that case, the centers of gravity of the intensities (the sums, one for each color, between different groups) of the light of the different colors emitted from the light-emitting portions coincide (for example, all located on the plane of incidence). Thus, it is possible to present the observer with an image with little color unevenness at or near the center of the optical pupil. This construction can be applied also in a case where the hologram optical element use does not have an axis-asymmetric positive optical power.

In the present invention, it is preferable that the light source have an even number of the three light-emitting portions, and that the light-emitting portions be arranged plane-symmetrically about the plane of incidence in such a way that the light-emitting portions located on opposite sides of and at an equal distance from the plane of incidence in the direction perpendicular thereto emit light of the same color. In that case, the centers of gravity of the intensities (the sums, one for each color, between different groups) of the light of the different colors emitted from the light-emitting portions coincide on the plane of incidence. Thus, it is possible to present the observer with an image with little color unevenness at the center of the optical pupil.

In the present invention, it is preferable that the light source have two groups of the three light-emitting portions, and that, within each group, the light-emitting portions be so arranged that they emit light of increasingly short wavelengths as one goes outward along the direction perpendicular to the plane of incidence away from the plane of incidence. In that case, for light of longer wavelengths, it is possible to reduce the intensity difference depending on the pupil position. Thus, it is possible to present the observer with an image with little color unevenness over the entire optical pupil.

In the present invention, it is preferable that the hologram optical element be a combiner that directs the image light from the display element and outside light simultaneously to the observer's eye. In that case, the observer can observe the image presented on the display element and an outside image simultaneously through the hologram optical element.

In the present invention, the eyepiece optical system may include a first transparent substrate that reflects, by internal total reflection, the image light from the display element and direct it through the hologram optical element to the observer's eye and that simultaneously transmits outside light to direct it to the observer's eye. Using a first transparent substrate like this permits observation of the image presented on the display element, and simultaneously offers high transmissivity to outside light, making it possible to observe a bright outside image.

In the present invention, it is preferable that the eyepiece optical system have a second transparent substrate that cancels the refraction of outside light by the first transparent substrate. In that case, it is possible to prevent distortion in the outside image that the observer observes through the eyepiece optical system.

According to the present invention, a head-mounted display may be provided with: the image display apparatus described above; and supporting means for supporting the image display apparatus in front of an observer's eye. With this construction, since the image display apparatus is supported by the supporting means, the observer can observe the image presented by the image display apparatus in a hands-free fashion.

According to the present invention, a head-mounted display that directs image light from an image display element through an eyepiece optical system to an observer's eye is provided with: an image display apparatus having a casing that houses the image display element and that holds part of the eyepiece optical system; and supporting means for supporting the eyepiece optical system in front of an observer's eye, wherein the image display apparatus includes: a light source for illuminating the image display element, the light source being mounted on a circuit board inside the casing and realized with a light-emitting diode; a heat absorbing member for absorbing the heat from the light source, the heat absorbing member being arranged on the face of the circuit board opposite from the face thereof on which the light source is mounted; and a heat conducting member for leading the heat absorbed by the heat absorbing member to outside the casing. Here, the circuit board may be a flexible printed circuit (FPC), and the light-emitting diode may be mounted on the FPC by being soldered thereto.

With this construction, when the light source realized with an LED is turned on to illuminate the image display element, the image light from the image displayed on the image display element is directed through the eyepiece optical system located in front of the observer's eye to the observer's eye. This enables the observer to observe the image.

The light source is mounted (for example, by being soldered) on the circuit board (for example, on land portions of the FPC) inside the casing. On the other hand, on the face of the circuit board opposite from the face thereof on which the light source is mounted, the heat absorbing member is arranged. This permits the heat generated by the light source to be efficiently rejected from the circuit board and efficiently absorbed through the surface of the heat absorbing member. In particular, in a case where the circuit board is realized with an FPC, the land portions of the FPC have a certain area on the FPC, and the heat absorbing member too has a certain area relative to the FPC. Thus, the heat generated by the light source can be efficiently rejected through the surface of the land portions, and the rejected heat can then be efficiently absorbed via the FPC through the surface of the heat absorbing member. Then, the heat absorbed by the heat absorbing member is led via the heat conducting member out of the casing, so as to be rejected therefrom. That is, with the construction described above, it is possible to efficiently lead the heat generated in the light source out of the casing so as to reject it, and it is thus possible to avoid a drop in image brightness and deterioration of components resulting from the heat generated by the light source.

In the present invention, it is preferable that the heat absorbing member be so arranged as to completely cover the part of the FPC opposite from the land portions. In that case, the heat absorbing member arranged on the back face of the FPC (on the face thereof opposite from where the light source is mounted) can absorb, via the land portions and hence across the minimum distance corresponding to the thickness of the FPC, the heat generated by the light source mounted on the front face of the FPC. This makes it easy for the heat absorbing member to absorb the heat that has traveled from the light source to the land portions 41.

It is preferable that the heat absorbing member be formed of a metal plate of a metal material having a thermal conductivity of 100 $Wm^{-1}K^{-1}$ or more. In that case, the heat absorbing member achieves highly efficient heat absorption. Moreover, when the heat absorbing member is formed of such a metal plate, it can be easily worked on and bonded to the FPC.

It is preferable that the heat conducting member be formed of a metal material having a thermal conductivity of 100 $Wm^{-1}K^{-1}$ or more. In that case, the heat absorbed by the heat absorbing member can travel to the heat conducting member easily, and can thus be rejected efficiently via the heat conducting member.

The image display apparatus may have a circuit board that supplies at least driving electric power and image signals to the light source and the image display element across a cable, and the heat conducting member may be realized with a shield conductor of the cable.

With this construction, the heat generated by the light source is absorbed, via the FPC, by the heat absorbing member, and is then led, via the shield conductor serving as the heat conducting member, out of the casing. The shield conductor is provided in the cable from the beginning for the purpose of shielding electromagnetic emissions, and thus, with the construction described above, it is possible to achieve heat rejection from the light source by making good use of the existing shield conductor. Moreover, when the cable is provided to run from inside to outside the casing, the heat absorbed by the heat absorbing member can be led via the heat conducting member (shield conductor) out of the casing easily and surely.

Part of the supporting means may be formed by a supporting-side metal portion formed of a metal material having a thermal conductivity of 100 $Wm^{-1}K^{-1}$ or more, and the heat conducting member may couple the heat absorbing member and the supporting-side metal portion together. With this construction, the heat generated by the light source is absorbed, via the FPC, by the heat absorbing member, and is then led, via the heat conducting member, to the supporting-side metal portion. Thus, heat rejection is achieved in the supporting-side metal portion. Moreover, since the supporting-side metal portion is formed of a metal material having a thermal conductivity of 100 $Wm^{-1}K^{-1}$ or more, the heat from the heat absorbing member travels to the supporting-side metal portion easily.

Part of the casing may be formed by a casing-side metal portion formed of a metal material having a thermal conductivity of 100 $Wm^{-1}K^{-1}$ or more, and the casing-side metal portion may be exposed to outside; the heat conducting member may couple the heat absorbing member and the casing-side metal portion together. With this construction, the heat generated by the light source is absorbed, via the FPC, by the heat absorbing member, and is then led, via the heat conducting member, to the casing-side metal portion. Since the casing-side metal portion is exposed to outside, the heat led thereto can be rejected to outside. Moreover, since the casing-side metal portion is formed of a metal material having a thermal conductivity of 100 $Wm^{-1}K^{-1}$ or more, the heat from the heat absorbing member travels to the casing-side metal portion easily.

The eyepiece optical system may include a volume-phase-type reflective hologram optical element so that the hologram optical element diffracts and thereby reflects the image light from the image display element to direct it to the observer's eye. A volume-phase-type reflective hologram optical element has narrow diffraction-efficiency half-peak wavelength widths, and offers high diffraction efficiency. Thus, using such a hologram optical element makes it possible to present a bright image with high color purity. Moreover, since the conjugate relationship between the light source and the pupil remains unchanged, the wavelengths of the image light do not vary, and thus it is possible to present an image with high-grade color reproduction.

The hologram optical element may be a combiner that directs the image light from the image display element and outside light simultaneously to the observer's eye. In that case, through the hologram optical element, the observer can observe the image presented on the image display element and an outside image simultaneously.

It is preferable that the diffraction-efficiency half-peak wavelength widths of the hologram optical element be 5 nm or more but 10 nm or less. When the diffraction-efficiency half-peak wavelength widths of the hologram optical element are as narrow as 5 nm or more but 10 nm or less in this way, the observer can observe a bright image with high color purity; in addition, since the light of the outside image is transmitted with high transmissivity, the observer can observe a bright outside image.

The light source may be realized with a plurality of light-emitting diodes having peak light emission intensities at different wavelengths. With this construction, the image display element is illuminated by a plurality of light sources, and thus the image display element can display a color image, enabling the observer to observe the color image. Moreover, the use of a plurality of light sources makes it possible to present a bright image with high-grade color reproduction.

The light source may have an even number of groups of three light-emitting portions emitting light corresponding to three primary colors, and the order in which the light-emitting portions are arranged in each group in the direction perpendicular to the plane of incidence along which the optical axis runs onto the hologram optical element may be reversed between adjacent groups. In that case, the centers of gravity of the intensities (the sums, one for each color, between different groups) of the light of the different colors emitted from the light-emitting portions coincide (for example, located on the plane of incidence). Thus, it is possible to present the observer with an image with little color unevenness at or near the center of the optical pupil.

Obviously, many modifications and variations of the present invention are possible in light of the above teachings. It is therefore to be understood that within the scope of the appended claims, the invention may be practiced other than as specifically described.

What is claimed is:

1. An image display apparatus, comprising:
   a light source that emits light having intensity peaks at predetermined wavelengths corresponding to three primary colors;
   a display element that produces an image by modulating the light emitted from the light source, the display element having color filters corresponding to the three primary colors;

an eyepiece optical system that directs image light from the display element to an observer's eye, the eyepiece optical system having a volume-phase-type reflective hologram optical element that diffracts the light from the display element, the hologram optical element having diffraction-efficiency peaks at wavelengths corresponding to the peak-intensity wavelengths of the light emitted from the light source; and a wavelength variation reduction mechanism that reduces variation of wavelengths of the light emitted from the light source.

2. The image display apparatus according to claim 1,
wherein, let any of the peak-intensity wavelengths of the light emitted from the light source be $\lambda L$ (nm), and let a corresponding one of the peak-diffraction-efficiency wavelengths of the hologram optical element be $\lambda H$ (nm), then the following formula is fulfilled:

$$\lambda H-10 \text{ nm} \leq \lambda L \leq \lambda H+10 \text{ nm}.$$

3. The image display apparatus according to claim 2,
wherein a half-peak wavelength width of any of the diffraction-efficiency peaks of the hologram optical element is 20 nm or less.

4. The image display apparatus according to claim 2,
wherein the following formula is fulfilled:

$$\lambda H-5 \text{ nm} \leq \lambda L \leq \lambda H+5 \text{ nm}.$$

5. The image display apparatus according to claim 4,
wherein a half-peak wavelength width of any of the peak-diffraction-efficiency wavelengths of the hologram optical element is 10 nm or less.

6. The image display apparatus according to claim 1,
wherein the light source includes a light-emitting diode.

7. The image display apparatus according to claim 1,
wherein the wavelength variation reduction mechanism includes a heat conducting member that conducts heat generated by the light source to outside.

8. The image display apparatus according to claim 7,
wherein the heat conducting member has a thermal conductivity of $100 \text{ Wm}^{-1}\text{K}^{-1}$ or more.

9. The image display apparatus according to claim 8,
wherein the heat conducting member is formed of metal.

10. The image display apparatus according to claim 1, further comprising:
a flexible printed circuit on which the light source is mounted,
wherein the wavelength variation reduction mechanism includes
a heat absorbing member that is arranged on a side of the flexible printed circuit opposite from a side thereof on which the light source is mounted, the heat absorbing member absorbing heat from the light source, and
a heat conducting member that leads the heat absorbed by the heat absorbing member to outside a casing.

11. The image display apparatus according to claim 10, further comprising:
a cable across which electric power is supplied,
wherein a shield conductor of the cable serves as the heat conducting member.

12. The image display apparatus according to claim 1,
wherein the light source has three light-emitting chips corresponding to R, G, and B, and
wherein the wavelength variation reduction mechanism includes a control circuit that controls driving of the individual light-emitting chips
so that light emission periods during which the three light-emitting chips emit light simultaneously alternate with heat rejection periods during which the three light-emitting chips cease to emit light for heat rejection and
so that the light emission periods are longer than the heat rejection periods.

13. The image display apparatus according to claim 1,
wherein the light source has three light-emitting chips corresponding to R, G, and B, and
wherein the wavelength variation reduction mechanism includes a control circuit that controls driving of the individual light-emitting chips
so that periods during which the three light-emitting chips respectively emit light are shifted from one another so that at least one of the three light-emitting chips does not emit light at any time.

14. The image display apparatus according to claim 1,
wherein the light source has three light-emitting chips corresponding to R, G, and B, and
wherein the wavelength variation reduction mechanism includes a control circuit that controls driving of the individual light-emitting chips
so that periods during which the three light-emitting chips respectively emit light do not overlap with one another.

15. The image display apparatus according to claim 1,
wherein the hologram optical element has an axis-asymmetric positive optical power.

16. The image display apparatus according to claim 15,
wherein an optical pupil formed by the eyepiece optical system is larger in a direction perpendicular to a plane of incidence along which an optical axis runs onto the hologram optical element than in a direction parallel to the plane of incidence.

17. The image display apparatus according to claim 16,
wherein the light source and the optical pupil are substantially conjugate with each other in a direction parallel to the plane of incidence.

18. The image display apparatus according to claim 16,
wherein the light source has three light-emitting portions corresponding to the three primary colors, and
wherein the three light-emitting portions are arranged in a direction perpendicular to the plane of incidence.

19. The image display apparatus according to claim 1,
wherein the light source has an even number of sets of three light-emitting portions corresponding to the three primary colors, and
wherein order in which the light-emitting portions are arranged within each set in a direction perpendicular to a plane of incidence along which an optical axis runs onto the hologram optical element is reversed between adjacent sets.

20. The image display apparatus according to claim 1,
wherein the light source has an even number of sets of three light-emitting portions corresponding to the three primary colors,
wherein the light-emitting portions are arranged plane-symmetrically with respect to a plane of incidence along which an optical axis runs onto the hologram optical element, and
wherein light-emitting portions located on opposite sides of and at an equal distance from the plane of incidence correspond to a same color.

21. The image display apparatus according to claim 20,
wherein the light-emitting portions are so arranged that wavelengths of light emitted therefrom are increasingly short in a direction perpendicular to and running away from the plane of incidence.

22. The image display apparatus according to claim 1, wherein the hologram optical element is a combiner that directs the image light from the display element and outside light simultaneously to the observer's eye.

23. The image display apparatus according to claim 1, wherein the eyepiece optical system includes a first transparent substrate that, by internal total reflection, reflects and thereby directs the image light from the display element through the hologram optical element to the observer's eye and that simultaneously transmits and thereby directs outside light to the observer's eye.

24. The image display apparatus according to claim 23, wherein the eyepiece optical system includes a second transparent substrate that cancels refraction of the outside light by the first transparent substrate.

25. A head-mounted display, comprising:

the image display apparatus according to claim 1, and a supporting member that supports the image display apparatus in front of the observer's eye.

* * * * *